(12) United States Patent
Osada et al.

(10) Patent No.: US 7,020,059 B2
(45) Date of Patent: Mar. 28, 2006

(54) ADJUSTMENT OPTICAL DISC FOR OPTICAL PICK-UP, ADJUSTMENT METHOD FOR OPTICAL PICK-UP, AND ADJUSTMENT APPARATUS FOR OPTICAL PICK-UP

(75) Inventors: Yasuo Osada, Saitama (JP); Junzo Kumakura, Kanagawa (JP); Hideo Nagasaka, Kanagawa (JP); Shuichi Hirosawa, Ibaraki (JP); Yoshihiro Kajiyama, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/109,672

(22) Filed: Apr. 20, 2005

(65) Prior Publication Data

US 2005/0185555 A1 Aug. 25, 2005

Related U.S. Application Data

(63) Continuation of application No. 09/913,716, filed as application No. PCT/JP00/09048 on Dec. 20, 2000.

(30) Foreign Application Priority Data

Dec. 20, 1999 (JP) ............................... P11-361799
Dec. 20, 1999 (JP) ............................... P11-361800

(51) Int. Cl.
*G11B 5/09* (2006.01)
*G11B 7/00* (2006.01)

(52) U.S. Cl. ............... 369/47.55; 369/53.1; 369/272.1; 369/53.45; 369/44.32

(58) Field of Classification Search ..................... None
See application file for complete search history.

(56) References Cited

U.S. PATENT DOCUMENTS 5,159,586 A  10/1992 Yamashita et al.

FOREIGN PATENT DOCUMENTS

| JP | 7-210876 | 8/1995 |
|----|----------|--------|
| JP | 8-45081 | 2/1996 |
| JP | 10-21568 | 1/1998 |
| JP | 10-149545 | 6/1998 |
| JP | 10-256596 | 9/1998 |
| JP | 11-203683 | 7/1999 |
| JP | 2001-23249 | 1/2001 |

*Primary Examiner*—Muhammad Edun
(74) *Attorney, Agent, or Firm*—Oblon, Spivak, McClelland, Maier & Neustadt, P.C.

(57) ABSTRACT

An adjustment method for optical pick-up including a light source for emitting light beams, an object lens for irradiating light beams onto an optical disc for adjustment and a drive portion for driving the object lens in a direction in parallel to the optical axis of the object lens and in a direction perpendicular to the optical axis thereof, wherein in the state where the light source is movably held with respect to the object lens and the drive portion is movably held with respect to the light source, light beams are irradiated onto an optical disc for adjustment concentrically having recording tracks from the optical pick-up to adjust relative position of the object lens with respect to the light source and inclination of the optical axis of the object lens, and an optical disc for adjustment used in such an adjustment method.

2 Claims, 16 Drawing Sheets

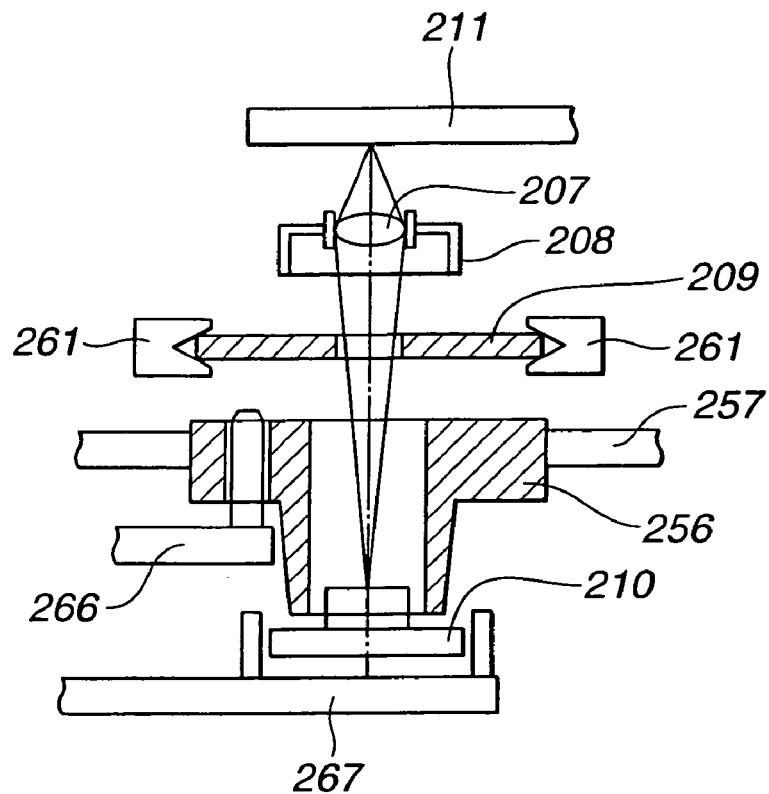
FIG.3
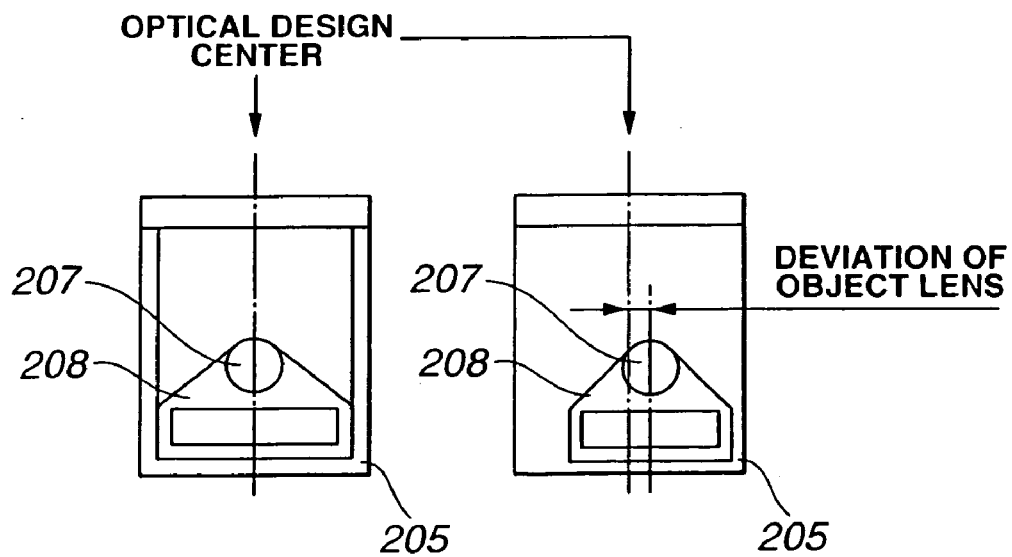
FIG.4A  FIG.4B

ADJUSTMENT OPTICAL DISC FOR OPTICAL PICK-UP, ADJUSTMENT METHOD FOR OPTICAL PICK-UP, AND ADJUSTMENT APPARATUS FOR OPTICAL PICK-UP

TECHNICAL FIELD

This invention relates to an adjustment optical disc for optical pick-up for adjusting optical characteristic of an optical pick-up which carries out recording and/or reproduction of information with respect to optical disc, an adjustment method for optical pick-up which adjusts optical characteristic of optical pick-up by using such an adjustment optical disc, and an adjustment apparatus for optical pick-up which adjusts optical characteristic of optical pick-up.

BACKGROUND ART

There are known optical pick-up devices for carrying out recording and/or reproduction of information with respect to optical disc, e.g., magneto-optical disc, etc.

The optical pick-up devices of this kind include an optical system including an object lens (objective) and an object lens drive unit for allowing object lens to undergo drive displacement in a direction in parallel to optical axis of object lens and in a direction perpendicular to the optical axis of the object lens.

The optical system includes a light source for emitting laser beams, the object lens for irradiating laser beams onto recording area of optical disc, a detector for receiving return light from the recording area of the optical disc, and various optical parts constituting the optical system.

The object lens drive unit includes, e.g., a lens holder for holding object lens, a holder supporting member for supporting this lens holder so that it is permitted to undergo displacement, plural elastic supporting members for permitting the lens holder to undergo elastic displacement, and an electromagnetic circuit section for allowing the lens holder to undergo drive displacement in a focusing direction in parallel to the optical axis of the object lens and in a tracking direction perpendicular to the optical axis of the object lens.

The lens holder is formed by, e.g., resin material, and includes a lens holding portion for holding the object lens. At the holder supporting member, a supporting portion for supporting the lens holder is formed, and an opening through which the optical axis of the object lens is passed is formed on the principal surface.

The elastic supporting member is formed by metallic material having elasticity so that it is linear. The elastic supporting member is adapted so that one end is fixed at the lens holder and the other end is fixed at supporting portion of the holder supporting member. Accordingly, the lens holder is supported at the holder supporting member through plural elastic supporting members so that it is permitted to undergo elastic displacement.

The electromagnetic circuit section includes a drive magnet and a drive coil which generate electromagnetic drive force, and a yoke constituting magnetic path. The drive coil includes a focusing coil and a tracking coil for respectively generating drive forces in the focusing direction and in the tracking direction.

In the above-described optical pick-up, the object lens held by the lens holder is moved in the focusing direction and in the tracking direction by the object lens drive unit. Thus, there are carried out recording and/or reproduction of information with respect to an arbitrary recording track of the optical disc.

The optical pick-up thus constituted is assembled with respect to base unit including feed mechanism for carrying out feed movement of the optical pick-up in the radial direction of the optical disc, disc rotation drive mechanism for rotationally driving the optical disc, and base chassis on which the feed mechanism and the disc rotation drive mechanism are provided. Thus, there is provided reproduction system of the optical disc.

The feed mechanism that the base unit has comprises a slide base for supporting the optical pick-up, a feed shaft for moving this slide base in the radial direction of the optical disc, a guide portion for movably supporting the slide base, and a drive mechanism for carrying out movement operation of the slide base. At the slide base, there are respectively formed a bearing portion movably supported by the feed shaft and a guide piece movably supported by the guide portion. The feed shaft is adapted so that the axial direction is caused to be in parallel to the radial direction of the optical disc and both ends are supported on the base chassis. In this feed mechanism, the slide base is moved in the radial direction of the optical disc along the feed shaft and the guide portion through the drive mechanism, whereby the optical pick-up is moved to an arbitrary recording track of the optical disc. Thus, information is reproduced from the optical disc.

The disc rotation drive mechanism includes a disc table on which optical disc is mounted and a spindle motor for rotationally driving this disc table. The disc table is attached on the rotation shaft of the spindle motor. The spindle motor is provided on the base chassis.

In the above-described optical pick-up, at the assembling step, in order to adjust relative position between the object lens and the light source and inclination of the optical axis of the object lens, there is used an adjustment apparatus for optical pick-up.

As an adjustment method for optical pick-up, two adjustment methods are used when roughly classified. The adjustment is carried out by the first adjustment method for carrying out adjustment by the optical pick-up itself and by the second adjustment method for carrying out adjustment in the state where the optical pick-up is assembled on the slide base of the base unit.

Initially, in the first adjustment method, optical pick-up to be adjusted is mounted on the slide base of the base unit where the feed mechanism and the disc rotation drive mechanism are provided with high accuracy as mechanism for adjustment. Thus, position and inclination of the optical axis of the object lens are adjusted.

At the base unit, the feed shaft of the feed mechanism is assembled with high accuracy on the base chassis as positioning reference of the optical pick-up, and the feed mechanism and the disc rotation drive mechanism are assembled with high accuracy with the feed shaft being as reference.

As shown in FIG. 1, a first adjustment apparatus (unit) 201 for carrying out adjustment of optical pick-up by the first adjustment method comprises a supporting mechanism 222 for adjustment including a slide base 220 for adjustment on which an optical pick-up 205 is mounted, a reference shaft 221 for movably supporting this adjustment slide base 220, and a supporting member 223 for supporting the slide base 220 with the reference shaft 221 being as reference.

Further, this first adjustment unit 201 comprises, as shown in FIG. 1, a lens adjustment mechanism 225 for adjusting position of an object lens 207 of the optical pick-up 205, a light source adjustment mechanism 226 for adjusting position of a light source 210 of the optical pick-up 205, an aberration detector 227 for measuring aberration in order to adjust positions of the light source 210 and the object lens 207 of the optical pick-up 205, a disc rotation drive mechanism 228 for rotationally driving an optical disc 211 for adjustment, and a disc movement mechanism 229 for moving this disc rotation drive mechanism 228.

At the adjustment supporting mechanism 222, as shown in FIG. 1, there is mounted the optical pick-up 205 on the slide base 220 for adjustment movably provided with the reference shaft 221 supported at a predetermined position by the supporting member 223 being as reference. The lens adjustment mechanism 225 includes a lens holding arm 231 for holding a lens holder 208 of the optical pick-up 205 to thereby hold the object lens 207, and movement mechanism (not shown) for moving this lens holding arm 231. The light source adjustment mechanism 226 includes a light source holding arm 234 for holding the light source 210, and movement mechanism (not shown) for moving this light source holding arm 234. As shown in FIG. 1, the aberration detector 227 is disposed at the position opposite to the object lens 207 of the optical pick-up 205, and is movably provided in a direction perpendicular to the optical axis of the object lens 207. The disc rotation drive mechanism 228 includes, as shown in FIG. 1, a disc holding member 237 for holding the adjustment optical disc 211, and a spindle motor 238 for rotationally driving this disc holding member 237. The disc movement mechanism 229 includes a guide member 239 for movably supporting the disc rotation drive mechanism 228, and movement mechanism (not shown) held by the disc rotation drive mechanism 228 and for moving the adjustment optical disc 211 in the radial direction of the adjustment optical disc 211 relative to the optical pick-up 205 along the guide member.

In accordance with the first adjustment unit 201 thus constituted, the adjustment optical disc 211 is rotationally driven by the disc rotation drive mechanism 228. As a result, the adjustment optical disc 211 is moved in the radial direction with respect to the object lens 207 by the disc movement mechanism 229. Further, position of the optical axis of the object lens 207 of the optical pick-up 205 is adjusted by the lens adjustment mechanism 225 and position of the light source 210 of the optical pick-up 205 is adjusted by the light source adjustment mechanism 226. In addition, adjustment is made such that there results a position where measured value that the aberration detector 227 measures is optimum.

In accordance with this first adjustment unit 201, the optical pick-up 205 is adjusted as single body so that the feed mechanism and the disc rotation drive mechanism are assembled with respect to base units respectively provided with high accuracy at ideal positions with respect to the feed shaft serving as the reference shaft, whereby they exhibit most performance.

Accordingly, in accordance with this first measurement method, the optical pick-up 205 can be adjusted as single body with high accuracy in the state where performance is guaranteed. Thus, it is possible to provide high accuracy optical pick-up 205 single body. In addition, since the optical pick-up thus adjusted can be assembled with respect to various base units different in specification such as configuration, etc., wide use characteristic is ensured.

However, in the first adjustment method, there exists inconvenience such that there exist unevenness in each assembling accuracy such as warp or inclination, etc. of the feed mechanism and the disc rotation drive mechanism or base chassis of base unit where optical pick-up 205 is assembled with respect to slide base 220 for adjustment in which the feed mechanism and the disc rotation drive mechanism have been caused to undergo positioning with high accuracy with respect to the reference shaft 221, whereby there takes place unevenness in assembling accuracy as the reproduction system followed by the above-mentioned unevenness.

As stated above, in the first adjustment method, in the case where the optical pick-up 205 is assembled with respect to base unit in which assembling accuracy is poor, performance as the reproduction system is lowered.

At the base unit, respective unevennesses of, e.g., the degree of plane of base chassis, inclination of rotation shaft of the spindle motor, plane vibration or eccentricity at the time of rotation of the disc table, and positional accuracy of the feed shaft, etc. are combined so that there takes place unevenness. For this reason, when actual productivity or production cost, etc. is taken into consideration, it cannot but tolerate that there takes place unevenness within a predetermined range.

In addition, in the optical pick-up 205 which has been adjusted, it is difficult to allow unevenness by adjustment to be zero, and there takes place unevenness of a predetermined distribution. For this reason, as the result of the fact that distribution of unevennesses of the adjusted optical pick-up 205 and distribution of unevennesses of base unit on which this optical pick-up 205 is assembled are combined, there is the possibility that there is constituted reproduction system in which unevenness greatly deviates from the allowed range.

On the other hand, as the second adjustment method, the single body of optical pick-up 205 is assembled with respect to the base unit, and position and inclination of the optical axis of the object lens 207 are adjusted as the entirety of the base unit. Thus, the optical pick-up 205 is assembled with high accuracy as the reproduction system.

As shown in FIG. 2, a second adjustment apparatus (unit) 202 for carrying out adjustment of the optical pick-up 205 by the second adjustment method comprises a lens adjustment mechanism 241 for holding a holder supporting member 209 of the optical pick-up 205 to adjust the object lens 207, a base holding mechanism 242 for holding a slide base 256 of base unit 206, a light source adjustment mechanism 243 for adjusting position of light source 210 of the optical system of the optical pick-up 205, and a detecting mechanism 244 for detecting optical characteristic of laser beams emitted from the object lens 207 which has been adjusted.

Moreover, at the base unit 206 held by the base holding mechanism 242, as shown in FIG. 2, there are provided, on a base chassis 251, a disc rotation drive mechanism 252 including a disc holding member 253 for holding optical disc 211 for adjustment and a spindle motor 254 for rotationally driving this disc holding member 253. Further, this base unit 206 includes the slide base 256 on which the optical pick-up 205 is assembled, a feed shaft 257 for movably supporting this slide base 256, and a feed motor 258 for allowing the slide base 256 to undergo feed operation.

The lens adjustment mechanism 241 includes, as shown in FIG. 2, a lens holding arm 261 for holding lens holder 208 of the optical pick-up 205 to thereby hold the object lens 207, and movement mechanism (not shown) for moving this lens holding arm 261. The base holding mechanism 242 includes, as shown in FIG. 2, a supporting member 264 for supporting the base unit 206, a base 265 on which this supporting member 264 is vertically provided, and an engagement member 266 engaged with the slide base 256 to carry out positioning. The light source adjustment mechanism 243 includes, as shown in FIG. 2, a light source holding arm 267 for holding the light source 210 of the optical pick-up 205, and movement mechanism (not shown) for moving this light source holding arm 267. The detection mechanism 244 includes a CCD (charge-Coupled Devices) camera 269 for detecting optical characteristic of laser beams emitted from the object lens 207.

In accordance with the second adjustment apparatus (unit) 202 thus constituted, optical disc 211 for adjustment is rotationally driven by the disc rotation drive mechanism 252 of the base unit 206. As a result, position of the optical axis of the object lens 207 of the optical pick-up 205 is adjusted by the lens adjustment mechanism 241, and position of the light source 210 of the optical pick-up 205 is adjusted by the light source adjustment mechanism 243. Thus, adjustment is made such that there results position where optical characteristic that the detection mechanism 244 detects is optimum.

In accordance with the second adjustment method, even if there respectively exist unevennesses in respective constituent parts of respective base units on which the optical pick-up 205 is assembled, adjustment is carried out in the state where the optical pick-up 205 is assembled with respect to the base unit 206, whereby unevenness as the assembled reproduction system can be reduced as compared to that of the reproduction system in which the optical pick-up 205 adjusted by the first adjustment method as described above is assembled with respect to the base unit.

Meanwhile, in the above-mentioned second measurement method, as shown in FIG. 3, in the state where the lens holder 208 which holds the object lens 207 or the holder supporting member 209 is held with high accuracy by the lens adjustment mechanism 241, and the slide base 256 is held with high accuracy at a predetermined position by the engagement member 266 of the base holding mechanism 242, the light source 210 or the optical system is held by the light source adjustment mechanism 243 so that adjustment is carried out. At this time, the slide base 256, the holder supporting member 209 and the light source 210 are respectively separately held, and adjustment is made by relatively moving these respective portions by very small quantity. For this reason, it is impossible to carry out feed operation in inner and outer circumferential directions of the optical disc 211 for adjustment. In order to carry out the feed operation in the above-described state, it is necessary to carry out movement so that relative positions are not changed in the state where the slide base 256, the holder supporting member 209 and the light source 210, etc. are respectively held. It is very difficult to realize such a movement.

However, when the second adjustment unit 202 reads information from recording track of the adjustment optical disc 211 in the state where the adjustment optical disc 211 is rotated at the time of adjustment, pit trains of the adjustment optical disc 211 are recorded in spiral form from the inner circumferential side toward the outer circumferential side. For this reason, the object lens 207 is gradually moved in the outer circumferential direction followed by rotation of the adjustment optical disc 211. In this adjustment unit 202, at the time of adjustment, the object lens 207 of the optical pick-up 205 is moved in the outer circumferential direction of the adjustment optical disc 211, whereby it is changed from the state of zero of visual field swing shown in FIG. 4A to the state of visual field swing which has been carried out shown in FIG. 4B. For this reason, the optical axis of the object lens 207 deviates (positionally shifts) with respect to the optical design center (hereinafter referred to as optical center) such as center, etc. of the light source 210. This adjustment method has the problem that since the optical axis of the object lens 207 deviates with respect to the optical center so that the optical characteristic is degraded and jitter value, etc. of detected reproduction signal is also degraded, it becomes very difficult to carry out adjustment in the case where, e.g., the optical axis of the object lens 207 is included to measure change of reproduction signal to allow the point to be measured to be in correspondence with the most favourable or best point to thereby adjust inclination of the optical axis of the object lens 207, etc.

As the countermeasure of this problem, various countermeasures are conceivable. In the case of carrying out adjustment of single body of the optical pick-up 205, the adjustment optical disc 211 is relatively moved in the inner circumferential direction and in the outer circumferential direction with respect to the slide base, the base chassis and the light source 210, etc. held by the base holding mechanism, whereby adjustment can be carried out while continuously reading information from the adjustment optical disc 211 in the state where the optical axis of the object lens 207 is not positionally shifted from the optical center.

However, even when this method is employed, in the case where consideration is rigorously made, as shown in FIG. 5, since lower frequency component of tracking error signal is extracted to carry out control of feed operation, it is impossible to carry out feed operation of the adjustment optical disc 211 if d.c. component of the tracking error signal is above a predetermined value.

Accordingly, with respect to the optical axis and the optical center of the object lens 207, there is carried out intermittent operation in which agreement or disagreement are repeated within a predetermined range. In this connection, pitch of this intermittent operation is about several 10 μm from a practical point of view.

Moreover, as another method, there is a method in which when the optical axis of the object lens 207 produces a predetermined positional shift with respect to the optical center, application of tracking servo is released to carry out feed operation toward the inner circumferential side of the adjustment optical disc 211 by positional shift quantity (hereinafter referred to as track jump) to thereby allow the optical axis of the object lens 207 to fall within the range of a predetermined positional shift quantity at all times with respect to the optical center.

However, if the number of rotations of the adjustment optical disc 211 is caused to be, e.g., 5 rotations/sec. (5 Hz) and the track pitch of recording tracks of the adjustment optical disc 211 is 1.6 μm, the optical axis of the object lens 207 is moved with respect to the optical center by 8 μm per one second, 40 μper five seconds ≈25 tracks. In practice, the optical axis of the object lens 207 is moved from the position of 40 μm at the inner circumferential side of the adjustment optical disc 211 with respect to the optical center, and the optical center and the optical axis of the object lens 207 are caused to coincide with each other after five minutes have been passed. At the time point when the optical axis of the object lens 207 is moved by 40 μm with respect to the optical center after five minutes have been further passed, application of tracking servo is released to carry out track jump by 80 μm≈50 tracks moved toward the inner circumferential side.

As stated above, the tracking servo and the track jump are carried out, thereby making it possible to adjust the optical axis of the object lens 207 so that it falls within the range of ±40 μm. However, in this method, even when the optical axis of the object lens 207 is caused to fall within the range of ±40 μm, the optical axis and the optical center of the object lens 207 are moved at all times. For this reason, there is the inconvenience that it is difficult to detect true value at the time of adjustment. Further, in this method, because time when tracking servo is stably applied is short, it takes much time in order that stable true value is measured by measurement instrument, e.g., jitter detector,etc. after track jump. For this reason, there is an inconvenience such that adjustment is difficult because time when position, etc. of optical axis of the object lens 207 can be adjusted is very short in practice. Further, in this method, there is the problem that when the interval of track jump is widened, positional shift of the optical axis of the object lens 207 is further increased.

In addition, in the case of a method of carrying out adjustment in the state where optical pick-up 205 is assembled on the base unit as shown in FIG. 6, it is impossible to move optical disc 211 for adjustment with respect to the base for adjustment. For this reason, when methods except for the method of repeating track jump are employed, adjustment is difficult. However, since there exist the above-described problems in this method, it is impossible to precisely carry out adjustment.

DISCLOSURE OF THE INVENTION

In view of the above, an object of this invention is to provide an adjustment optical disc for optical pick-up, an adjustment method for optical pick-up and an adjustment apparatus for optical pick-up which can adjust optical pick-up with high accuracy in the state where the optical axis of the object lens and the optical design center are caused to coincide with each other at all times.

To attain the above-described object, in the adjustment optical disc for optical pick-up according to this invention, recording tracks are concentrically formed.

In the adjustment optical disc for optical pick-up thus constituted, annular recording tracks are concentrically formed. Thus, it becomes possible to allow the optical axis of the object lens of optical pick-up to be adjusted to coincide with the optical design center at all times. For this reason, it is possible to adjust the optical axis of the object lens with high accuracy.

Moreover, in the adjustment method for optical pick-up according to this invention, an optical disc for adjustment concentrically having recording tracks is used to adjust relative position of object lens with respect to light source and inclination of the optical axis of the object lens in the state where an optical pick-up including a light source for emitting light beams and an object lens (objective) for irradiating light beams is assembled onto a base unit including a slide base for supporting the optical pick-up, a guide shaft for movably supporting this slide base, a feed mechanism for allowing the slide base to undergo feed operation in the radial direction of the adjustment optical disc, and a disc rotation drive mechanism for rotationally driving the adjustment optical disc.

In accordance with the above-described adjustment method for optical pick-up, adjustment optical disc having concentric recording tracks is used so that relative position of optical axis of the object lens and inclination of the optical axis of the object lens with respect to the light source are adjusted in the state where the optical pick-up is assembled on the base unit. Thus, the optical pick-up is adjusted with high accuracy as reproduction system.

Further, the adjustment apparatus for optical pick-up according to this invention is directed to an adjustment apparatus for optical pick-up, which carries out positional adjustment in the state where an optical pick-up comprising a lens holder for holding an object lens, an elastic supporting member for permitting this lens holder to undergo elastic displacement in biaxial directions, a holder supporting member for displacably supporting the leans holder through the elastic supporting member and an optical system including a light source for emitting light beams is combined with respect to a base unit comprising a slide base on which the holder supporting member is attached, a feed mechanism for carrying out feed operation of the slide base through a guide shaft which movably supports this slide base, a disc rotation drive mechanism for rotationally driving an optical disc for adjustment having concentric recording tracks and a base chassis for supporting the feed mechanism and the disc rotation drive mechanism.

The adjustment apparatus for optical pick-up comprises a base for adjustment on which base unit is mounted after undergone positioning, chassis holding means for holding feed shaft of the base unit to thereby hold a base chassis, lens holding means for holding holder supporting member of the optical pick-up to thereby hold an object lens, base holding means for holding slide base, and lens adjustment means for adjusting position of optical axis of the object lens and inclination with respect to the optical axis thereof through the lens holding means. Moreover, this adjustment apparatus for optical pick-up comprises light source holding means for holding light source of the optical system, light source adjustment means for adjusting position of light source and inclination with respect to optical axis through the light source holding means, and detecting means for detecting optical characteristic of light beams emitted from the adjusted object lens.

In accordance with the optical pick-up adjustment apparatus thus constituted, when relative position of optical axis of the object lens and inclination of the optical axis of the object lens with respect to the light source are adjusted in the state where the optical pick-up is assembled on the slide base of the base unit, adjustment optical disc having concentric recording tracks is used, whereby there is no possibility that the optical pick-up deviate from recording tracks with passage of time at the time of adjustment. Thus, the optical pick-up is adjusted with high accuracy as the reproduction system.

Still further objects of this invention and more practical merits obtained by this invention will become more apparent from the description of the embodiments which will be given below.

BRIEF DESCRIPTION OF THE DRAWINGS

FIG. 3 is a longitudinal cross sectional view showing optical pick-up held by the conventional first adjustment apparatus.

FIG. 4A is a plan view showing the state where visual field swing of object lens of the optical pick-up is zero.

FIG. 4B is a plan view showing the state where visual field swing of the object lens of the optical pick-up has been made.

BEST MODE FOR CARRYING OUT THE INVENTION

An adjustment optical disc for optical pick-up, an adjustment apparatus for optical pick-up and an optical pick-up adjusted and assembled by the adjustment apparatus for optical pick-up according to this invention will now be described in more practical manner.

First, the adjustment optical disc for optical pick-up and the optical pick-up adjusted and assembled by the adjustment apparatus for optical pick-up will be described.

Figure 1:
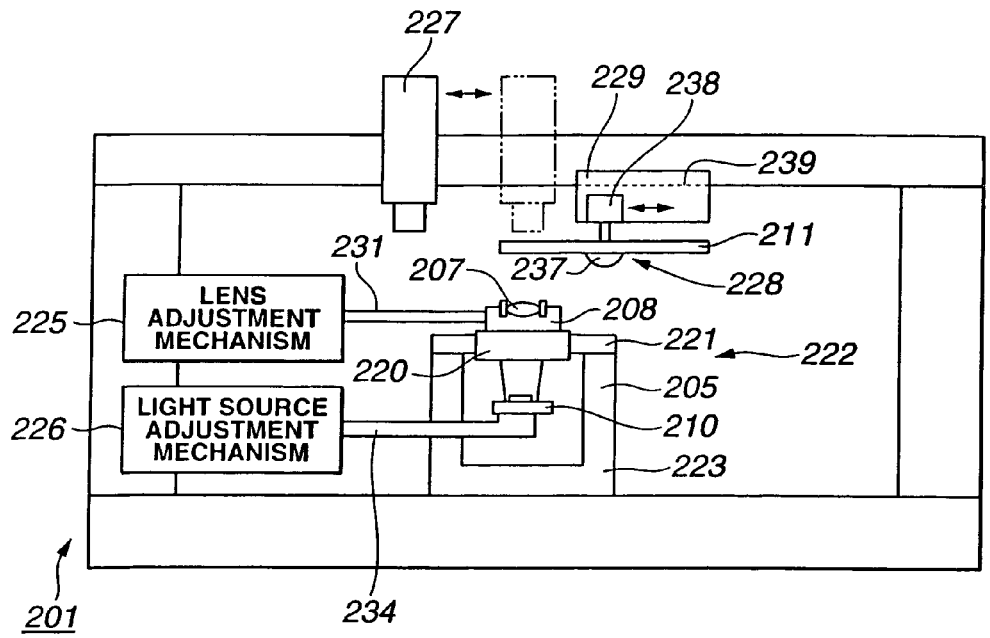
FIG. 1 is a model view showing a conventional first adjustment apparatus.
Figure 2:
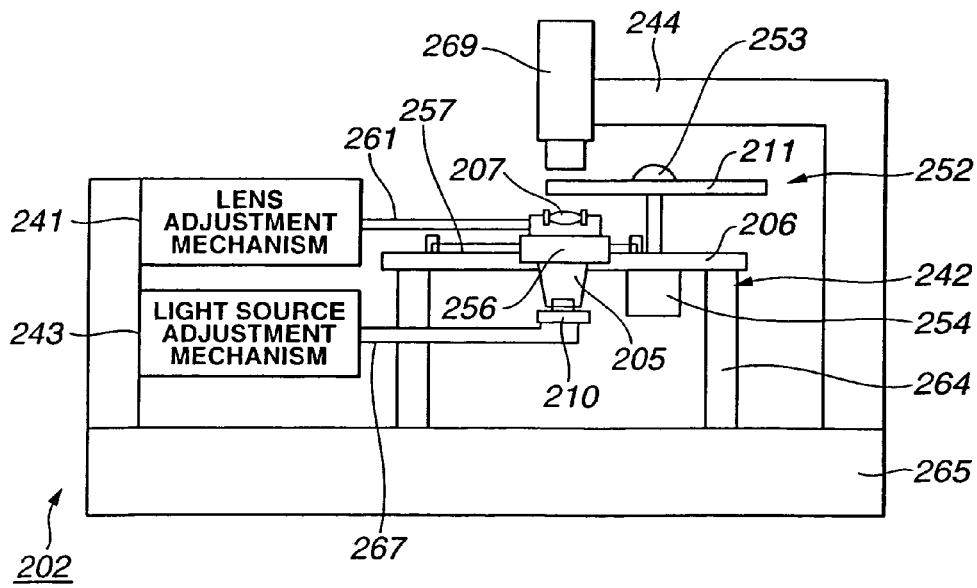
FIG. 2 is a model view showing a conventional second adjustment apparatus.
Figure 5:
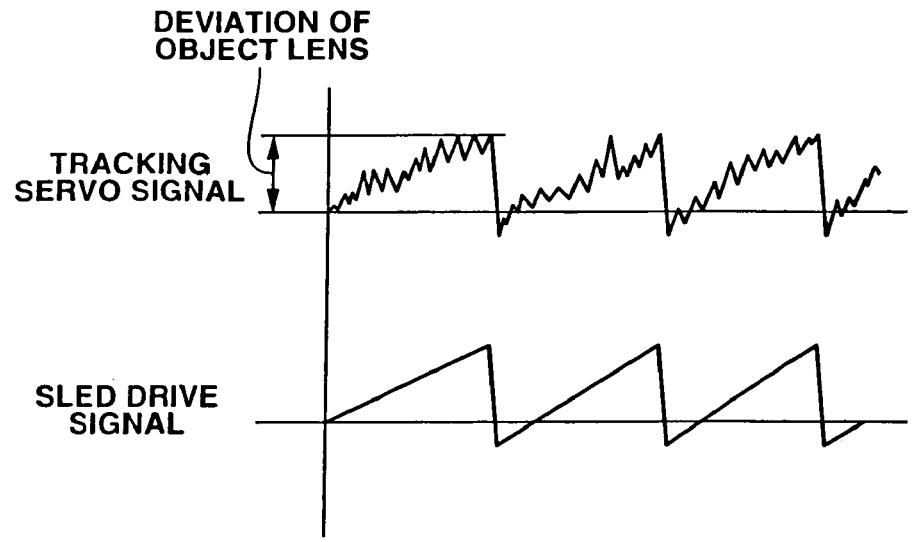
FIG. 5 is a view showing tracking servo signal and sled drive signal of object lens.
Figure 6:
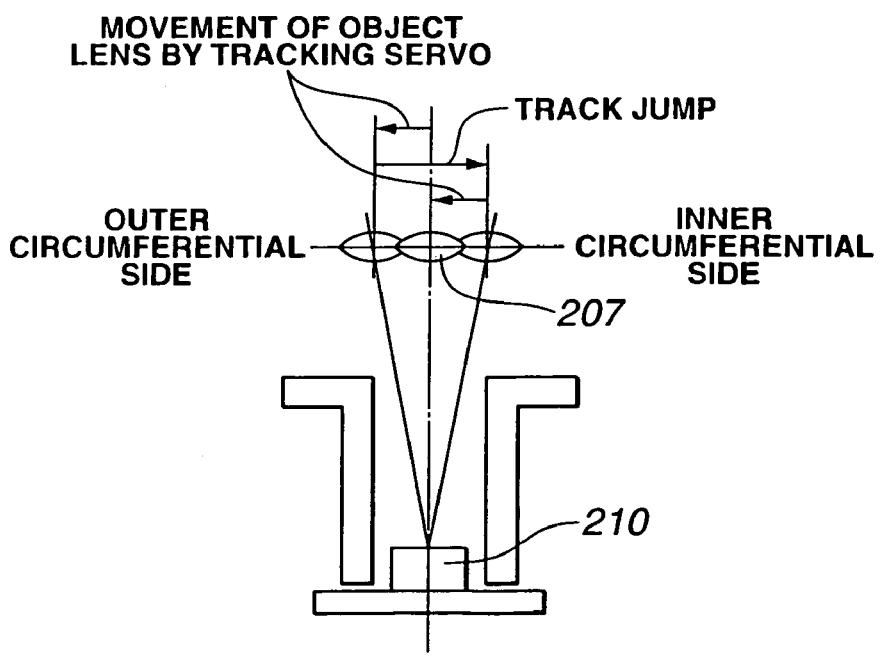
FIG. 6 is a view showing track jump of the object lens.
Figure 7:
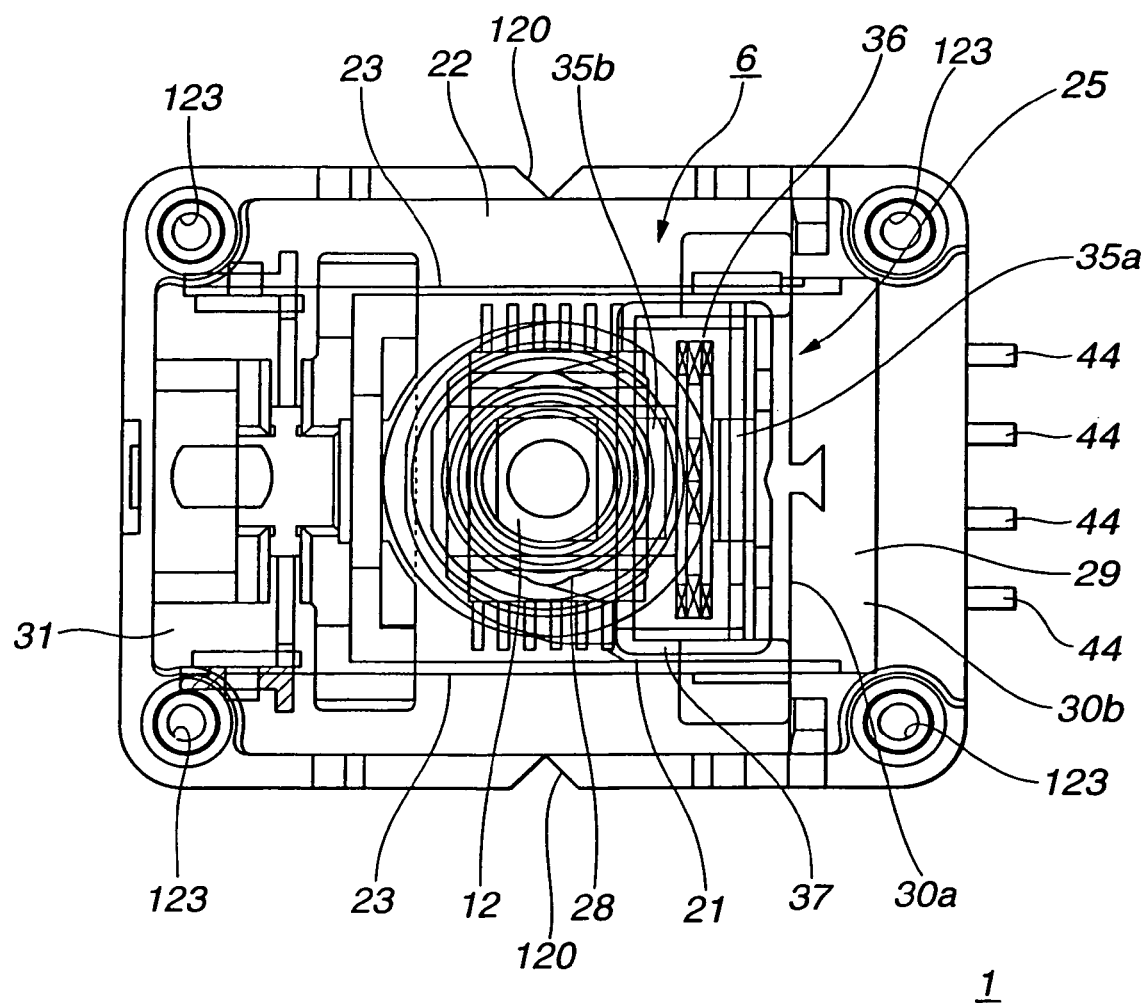
FIG. 7 is a plan view showing optical pick-up adjusted by an adjustment apparatus for optical pick-up according to this invention.
Figure 8:
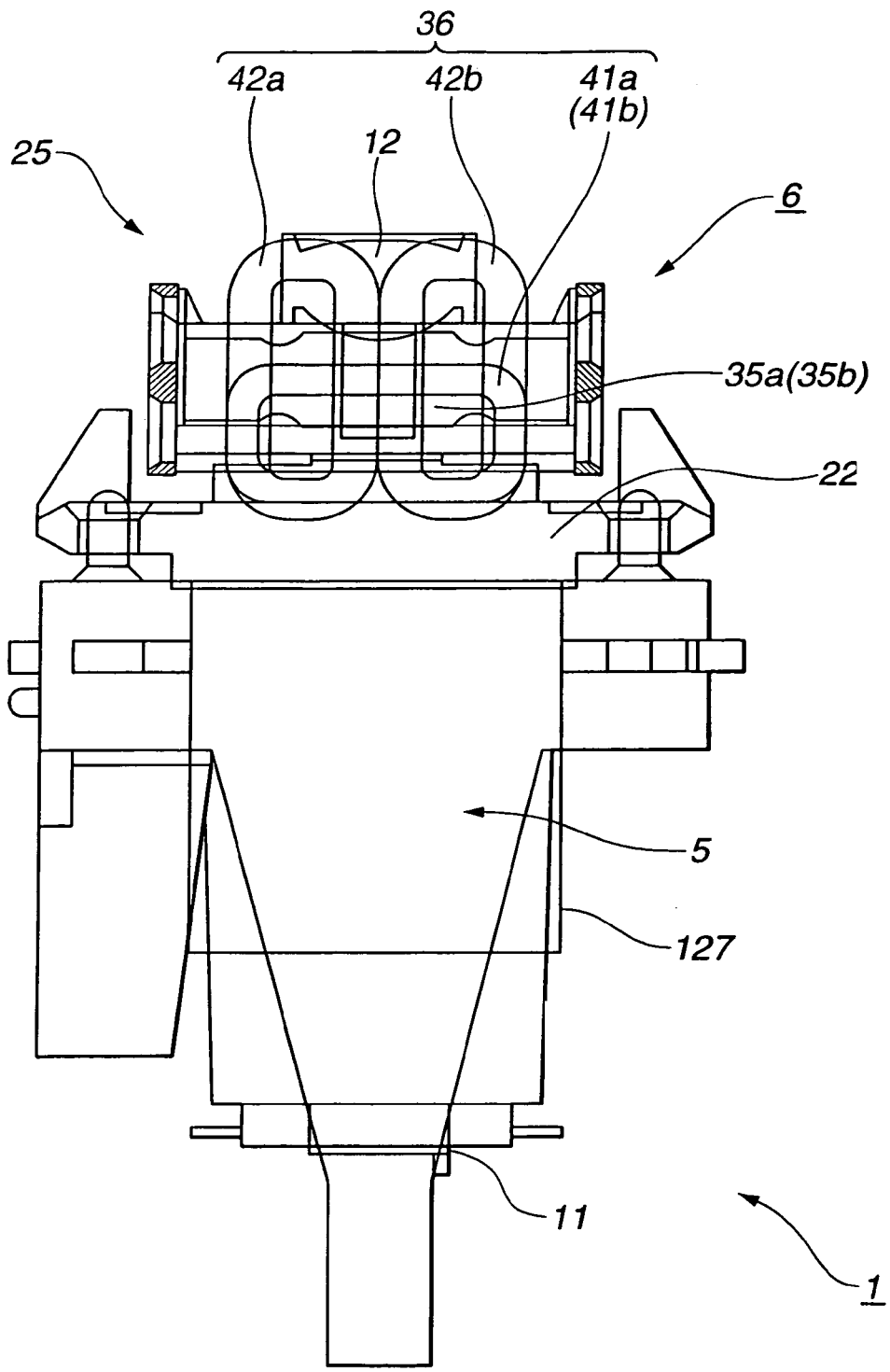
FIG. 8 is a longitudinal cross sectional view showing the optical pick-up.

As shown in FIGS. 7 and 8, optical pick-up 1 includes an optical system 5 including an object lens 12 and an object lens driving portion 6 for driving the object lens 12. The optical system 5 includes a light source 11 for emitting laser beams, an object lens 12 for irradiating laser beams emitted from this light source 11 onto the recording area of the optical disc, a light receiving portion 13 for receiving return light from the recording area of the optical disc, and varius optical parts constituting an optical path. The light source 11 includes semiconductor laser and hologram element for separating laser beams emitted from the semiconductor laser into the 0-th order light and the ±1-st order light, and/or separating laser beams incident through the object lens 12. The light receiving portion 13 is provided integrally with the light source 11 and receives laser beams separated by the above-described hologram element. While adjustment of the optical pick-up 1 provided with such an optical system 5 will be described later, optical pick-up using optical system in which the light source 11 and the light receiving portion 13 are caused to be separate from each other will be similarly adjusted.

The object lens drive portion 6 includes, as shown in FIGS. 7 and 8, a lens holder 21 for holding the object lens 12, elastic supporting members 23,23,23,23 for permitting this lens holder 21 to undergo elastic displacement, a holder supporting member 22 for supporting the lens holder 21 so that it is permitted to undergo elastic displacement through the elastic supporting members 23, 23, 23, 23, and an electromagnetic drive portion 25 for driving the lens holder 21 in biaxial directions of the focusing direction in parallel to the optical axis of the object lens 12 and the tracking direction perpendicular to the optical axis of the object lens 12.

The lens holder 21 consists of, e.g., resin material, and includes a substantially cylindrical lens holding portion 28 for holding the object lens 12. Moreover, a metallic yoke 37 that the electromagnetic drive portion 25 which will be described later is integrally insert-molded with respect to the lens holder 21. Further, at the lens holder 21, there is integrally and projectedly formed a center of gravity adjustment portion 29 for adjusting center of gravity position of the entirety of the lens holder 21 serving as a movable portion at each of positions opposite with the lens holding portion 28 being put therebetween. In addition, at this center of gravity adjustment portion 29, as shown in FIG. 7, there are respectively formed in a manner perpendicular to each other first and second reference surfaces 30*a*, 30*b* for carrying out positioning of the lens holder 21 so that it is located at a predetermined position.

The holder supporting member 22 is formed by, e.g., resin material, wherein there is formed a supporting member 31 for supporting the lens holder 21 through the elastic supporting members 23,23, 23,23. In addition, on the principal surface of the holder supporting member 22, there is formed an opening 32 through which the optical axis of the object lens 12 is passed.

Each elastic supporting member 23 is linearly formed by metallic material having elasticity. These elastic supporting members 23 are adapted so that one ends are fixed to the outer circumferential portion of the lens holder 21 and the other ends are fixed to the supporting portion 31 of the holder supporting member 22 through, e.g., adhesive agent, and are thus provided in parallel to each other. Accordingly, the lens holder 21 is supported by the supporting member 31 of the holder supporting member 22 through plural elastic supporting members 23, 23, 23, 23 so that it is permitted to undergo elastic displacement.

As shown in FIG. 7, the electromagnetic drive portion 25 is disposed at position adjacent to the lens holding portion 28 of the lens holder 21. This electromagnetic drive portion 25 includes, as shown in FIG. 7, a set of drive magnets 35*a*, 35*b* and drive coil 36 for producing an electromagnetic force, and a yoke 37 constituting closed magnetic path. The drive magnets 35*a*, 35*b* are respectively bonded (connected) and fixed on the yoke 37 through, e.g., adhesive agent. The drive coil 36 is integrally insert-molded at the holder supporting member 22 consisting of resin material. The drive coil 36 includes, as shown in FIG. 8, a set of focusing coils 41*a*, 41*b* and a set of tracking coils 42*a*, 42*b* for respectively producing respective drive forces of the focusing direction and the tracking direction.

Further, the electromagnetic drive portion 25 includes connection terminals 44 for delivering power to the drive coil 36. As shown in FIG. 7, these connection terminals 44 are positioned at the side end portion of the holder supporting member 22 and are integrally insert-molded with respect to the holder supporting member 22 in a manner to project the connection ends toward the external. Such connection terminals are respectively electrically connected with respective end portions of the focusing coils 41a, 41b and tracking coils 42a, 42b within the holder member 22.

The yoke 37 is formed by metallic plate having magnetism, e.g., stainless steel, etc. so as to take substantially rectangular frame shape, and is insert-molded into the lens holder 21 so that it serves as reinforcement member to enhance mechanical strength of the lens holder 21.

In the optical pick-up 1 thus constituted, the lens holder 21 for holding the object lens 12 is driven in the focusing direction and in the tracking direction by the object lens drive portion 6. As a result, laser beams are focused on an arbitrary recording track of the recording area of the optical disc. Thus, recording and/or reproduction of information with respect to the optical disc are carried out.

Further, in this optical pick-up 1, as the tracking error detection method for the object lens 12, tracking error detection is carried out by the so-called three beam method in which three beams consisting of the 0-th order light and ±1-st order light positioned between which the 0-th order light is put are used as laser beams emitted from the light source 11 to detect tracking error by beam spot of the ±1-st order light.

The above-described optical pick-up 1 is assembled so that relative position between the light source 11 and the object lens 12 is caused to undergo positioning by adjustment apparatus (unit) 101 for optical pick-up according to this invention which will be described later in the state where the optical pick-up 1 is assembled on a base unit 51 including a feed mechanism 55 for carrying out feed operation of this optical pick-up 1 in the radial direction of the optical disc, a disc rotation drive mechanism 56 for rotationally driving the optical disc and a base chassis 57 on which the feed mechanism 55 and the disc rotation drive mechanism 56 are provided. The optical pick-up thus assembled is caused to serve as reproduction system of the optical disc.

The feed mechanism 55 that the base unit 51 has comprises a slide base 61 for supporting the optical pick-up 1, a feed shaft 62 for moving this slide base 61 in the radial direction of the optical disc, guide portion (not shown) for movably supporting the slide base 61, and drive mechanism (not shown) for carrying out movement operation of the slide base 61.

The slide base 61 is adapted so that, although not shown, bearing portion movably supported by the feed shaft 62 and guide piece movably supported by the guide portion are respectively formed. The feed shaft 62 is adapted so that axial direction is caused to be in parallel to the radial direction of the optical disc and both ends are supported on the slide base 61. The drive mechanism includes feed motor for driving the slide base 61. In the above-mentioned feed mechanism 55, as the result of the fact that the slide base 61 is moved in the radial direction of the optical disc along the feed shaft 62 and the guide portion through the drive mechanism, the optical pick-up 1 is moved to an arbitrary recording track of the optical disc. Thus, information is reproduced from the optical disc.

Figure 11:
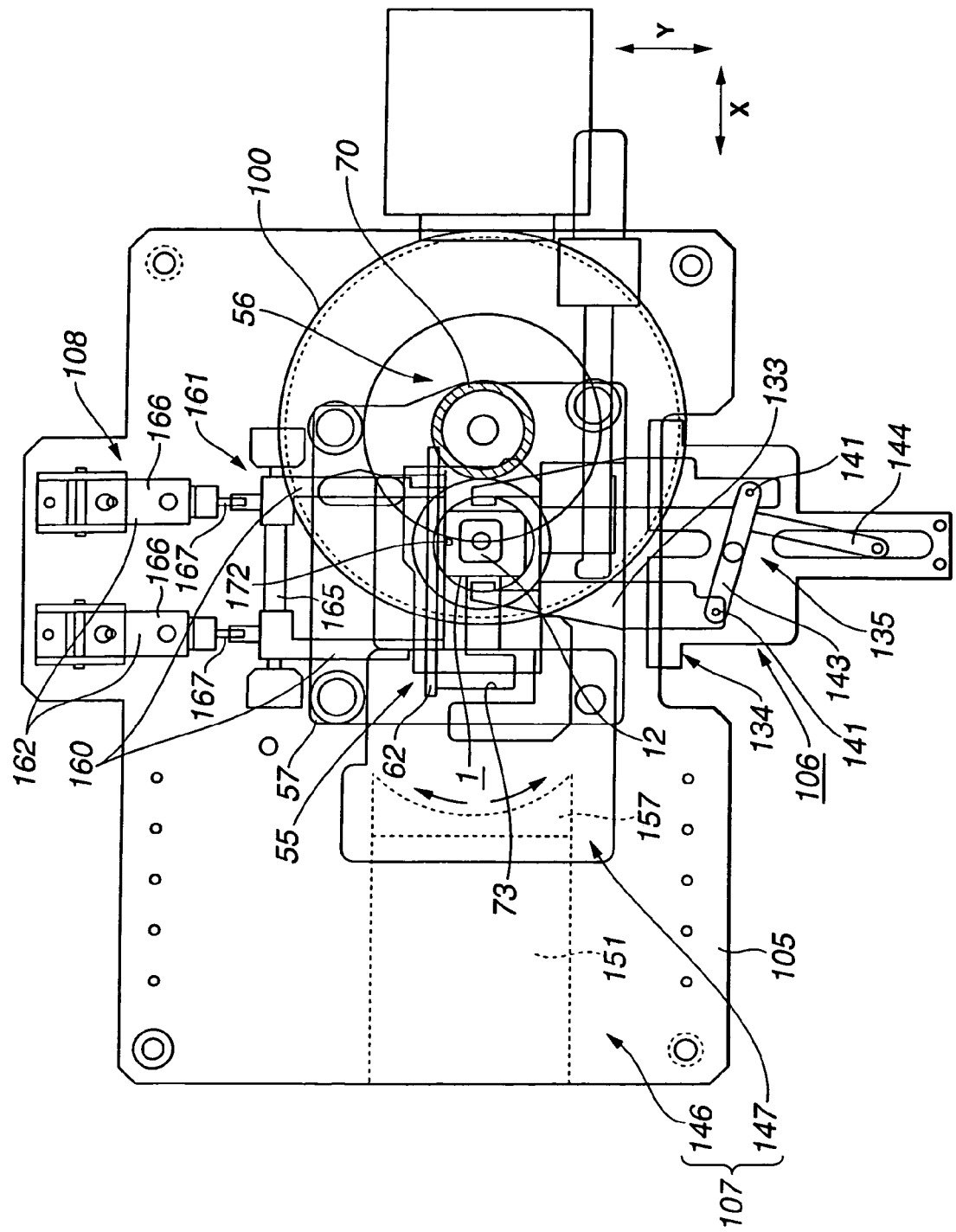
FIG. 11 is a plan view showing the adjustment apparatus for optical pick-up.

The disc rotation drive mechanism 56 includes a disc table 70 on which optical disc is mounted, and a spindle motor 71 for rotationally driving this disc table 70. The disc table 70 is attached on the rotation shaft of the spindle motor 71. The spindle motor 71 is provided on the base chassis 57. The base chassis 57 is formed by metallic material so as to take substantially rectangular shape, and is adapted so that there is formed an opening portion 73 for permitting the optical pick-up 1 to be moved in the radial direction of the optical disc on the principal surface thereof as shown in FIG. 11.

In the above-described optical pick-up 1, at the assembling steps, in order to adjust relative position between the object lens 12 and the light source 11 and position and inclination of the optical axis of the object lens 12, adjustment unit for optical pick-up is used.

An adjustment optical disc 100 for optical pick-up according to this invention used for adjusting the above-described optical pick-up 1 has concentric recording tracks. This adjustment optical disc 100 has the same format as that of the so-called compact disc or mini disc (Trade Name). Further, at respective recording tracks of the adjustment optical disc 100, pit trains caused to be multiple of integer of unit pit length are recorded at about 1.6 µm pitch. The information recording area of this adjustment optical disc 100 is caused to be the same as that of the compact disc, wherein the innermost circumference and the outermost circumference are respectively formed so that the inner diameter is 50 mm and outer diameter is 116 mm, and the lead-in area and the lead-out area are respectively formed so that inner diameter is 46 mm and outer diameter is 117 mm.

Accordingly, in this adjustment optical disc 100, respective recording tracks are reproduced by the optical pick-up 1 so that information of multiple of integer of unit pit length are securely reproduced. For this reason, in accordance with this adjustment optical disc 100, since the lens 12 can be moved on the same recording track, it is possible to adjust position of optical axis of the object lens 12 in the state where optical design center (hereinafter referred to as optical center) and the optical axis of the object lens 12 are caused to be in correspondence with each other at all times. At recording tracks of the adjustment optical disc 100, there are recorded information indicating position in the radial direction from the center of the adjustment optical disc 100. As information indicating position in the radial direction, information indicating absolute position are recorded from the center of the adjustment optical disc 100 by the format similar to sub code or format in conformity therewith, e.g., at the portion corresponding to sub code of the so-called compact disc.

Figure 9:
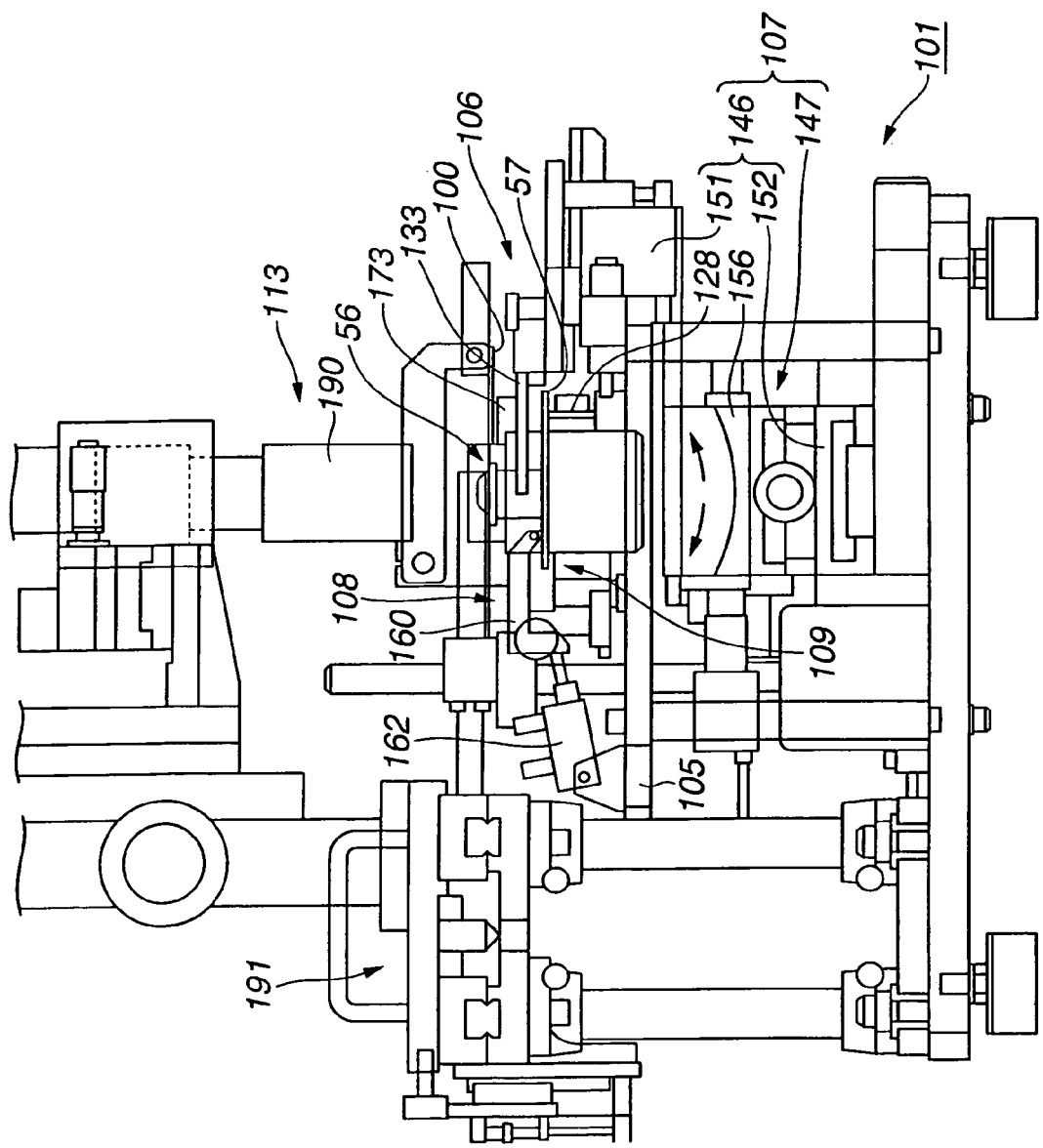
FIG. 9 is a side view showing the adjustment apparatus for optical pick-up.
Figure 10:
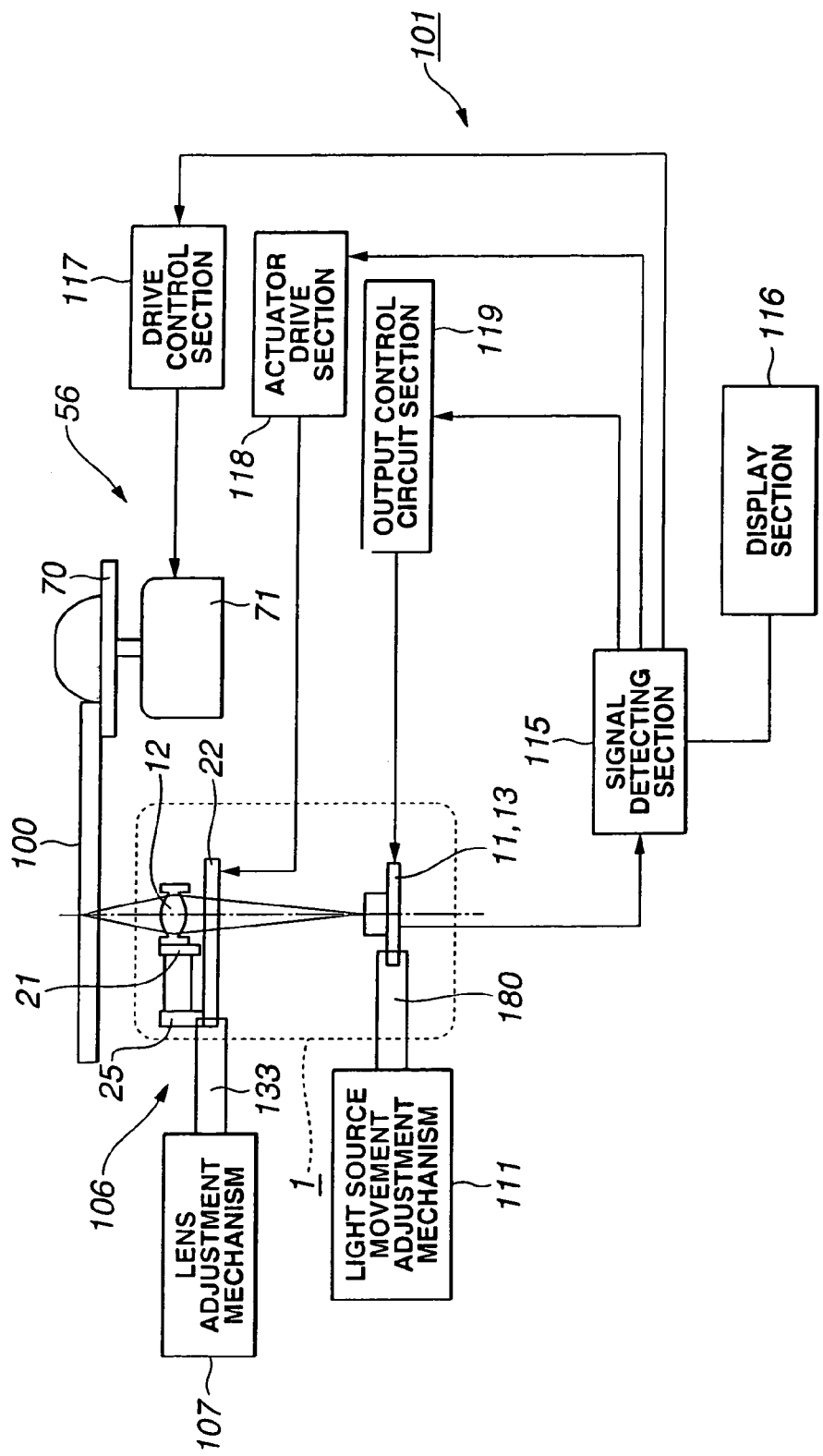
FIG. 10 is a block diagram showing the configuration of the adjustment apparatus for optical pick-up.

Further, as shown in FIGS. 9 and 10, the adjustment unit 101 for optical pick-up according to this invention comprises an adjustment base 105 on which the base unit 51 in which optical pick-up 1 to be adjusted is combined is mounted, a lens holding mechanism 106 for holding the holder supporting member 22 of the optical pick-up 1 to thereby hold the object lens 12, a lens adjustment mechanism 107 for adjusting position of the object lens 12 through this lens holding mechanism 106, a chassis holding mechanism 108 for holding the feed shaft 62 of the base unit 51 to thereby hold the base chassis 57, and a base holding mechanism 109 for holding the slide base 61 of the base unit 51.

Further, this optical pick-up adjustment unit 101 comprises, as shown in FIGS. 9 and 10, a light source movement adjustment mechanism 111 for holding the light source 11 of the optical pick-up 1 to carry out movement adjustment, and a detection mechanism 113 for detecting optical characteristic of laser beams emitted from the object lens 12 of the optical pick-up 1 which has been adjusted.

Further, this optical pick-up adjustment unit 101 comprises, as shown in FIG. 10, a signal detecting section 115 for detecting reproduction signal outputted from the light receiving section 13 of the optical pick-up 1, a display section 116 for displaying signal detected by this signal detecting section 115, a drive control section 117 for controlling the disc rotation drive mechanism 56 of the base unit 51, an actuator drive section 118 for carrying out drive control of the electromagnetic drive section 25 of the optical pick-up 1, and an output control circuit section 119 for controlling output of laser beams of the light source 11.

Figure 14:
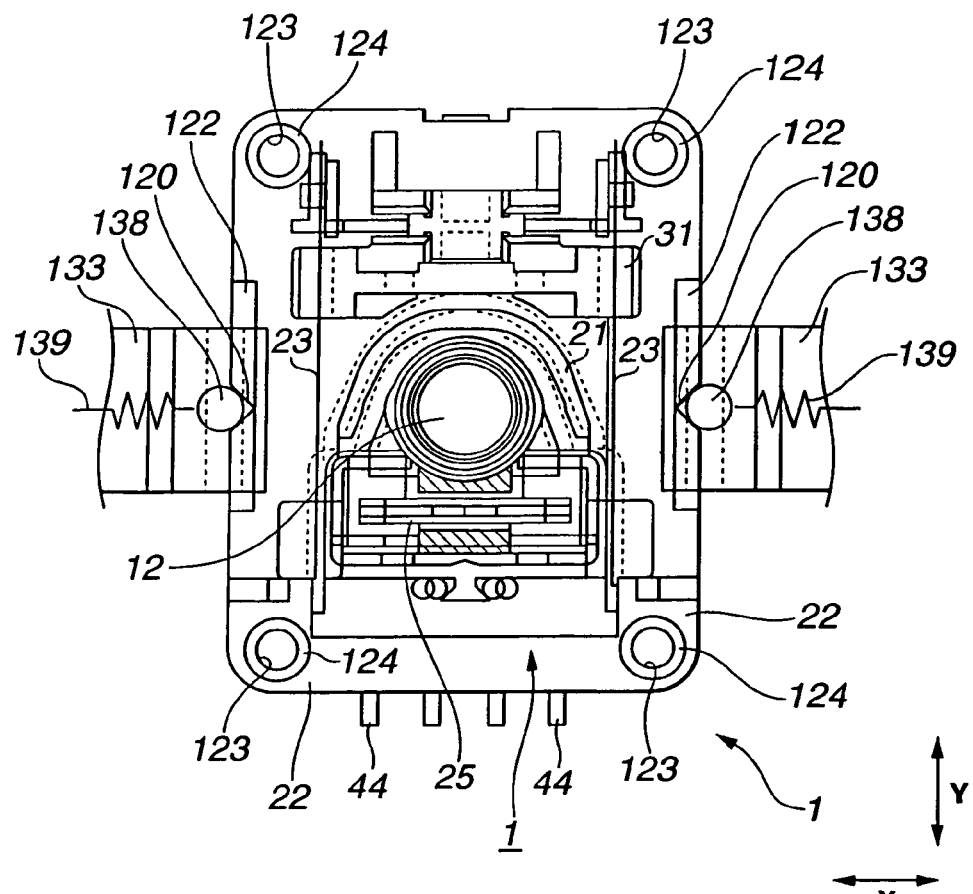
FIG. 14 is a plan view showing the essential part of optical pick-up held by the lens holding mechanism.
Figure 15:
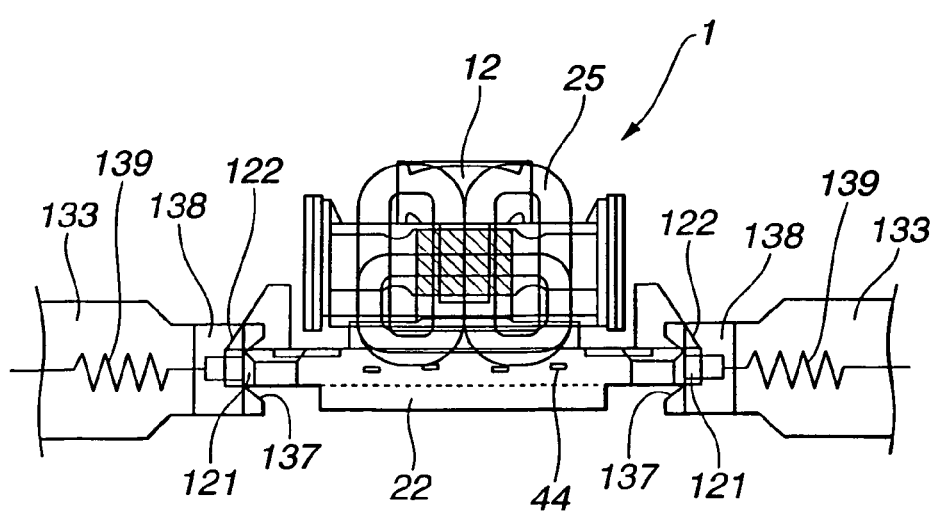
FIG. 15 is a side view showing the essential part of the optical pick-up held by the lens holding mechanism.

Meanwhile, at the optical pick-up 1 mounted on the adjustment base 105, as shown in FIGS. 14 and 15, engagement grooves 120 for positioning are respectively formed at opposite positions of the outer circumferential portion of the holder supporting member 22. These engagement grooves 120 are cut and formed so that they take substantially V-shape with respect to the principal surface of the holder supporting member 22. Moreover, engagement projections 121 for positioning each having an inclined surface 122 so as to take substantially V-shape in cross section with respect to the thickness direction are cut and formed over a predetermined range with the position where the engagement grooves 120 are formed being as center at opposite positions of the outer circumferential portion of the holder supporting member 22.

Further, at the holder supporting member 22, as shown in FIGS. 14 and 15, positioning holes 123 are respectively formed at respective corner portions. At these positioning holes 123, there are formed cut portions 124 for engagement in which opening portions adjacent to the portion on the principal surface of the holder supporting member 22 are chamfered so as to take substantially funnel shape and adhesive agent is filled thereinto so that they are engaged.

Figure 12:
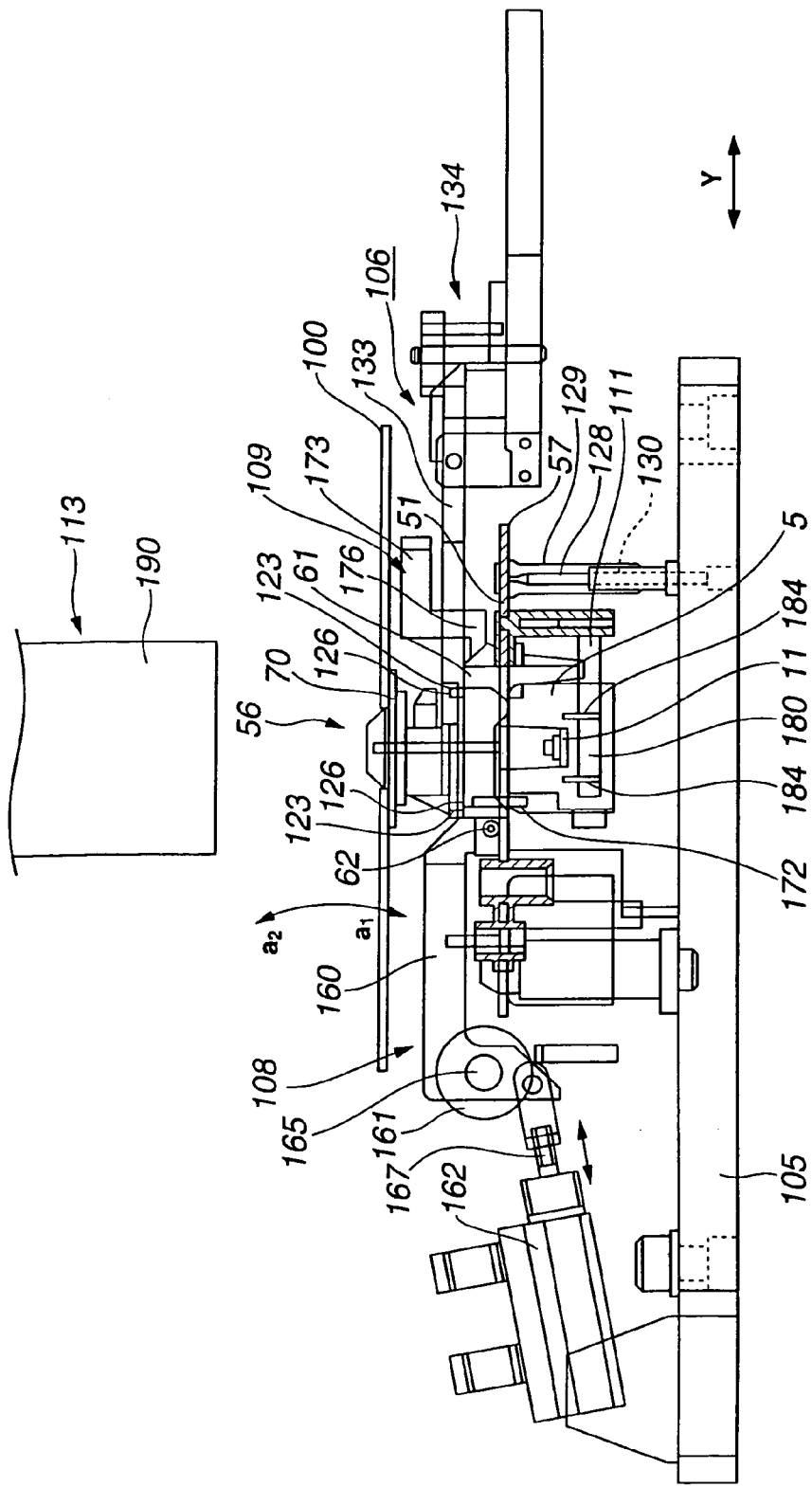
FIG. 12 is a cross sectional view showing lens holding mechanism, lens adjustment mechanism, chassis holding mechanism and base holding mechanism that the adjustment apparatus for optical pick-up has.

Further, at the slide base 61 that the base unit 51 has, as shown in FIG. 12, positioning pins 126 inserted into the positioning holes 123 of the holder supporting member 22 so that they are engaged and are integrally respectively formed in a projected manner at respective corner portions. These positioning pins 126 are formed so that the front end portions take circular arc in cross section, and are formed so that front end portions are projected from the positioning holes 123 of the holder supporting member 22.

As the result of the fact that front end portions of positioning pins 126 are formed substantially semi-circular arc in cross section, when the positioning pins 126 are inserted into the positioning holes 123, the slide base 61 can be satisfactorily inserted without colliding with the positioning holes 123. As adhesive agent filled into gap between the positioning hole 123 and the positioning pin 126, e.g., ultraviolet hardening type adhesive agent is used. The outer diameter of the positioning pin 126 is formed in the state where it is smaller than the inner diameter of the positioning hole 123 so that adhesive agent of a predetermined quantity is filled and a predetermined gap sufficient to movably adjust relative position between the holder supporting member 22 and the slide base 61 is formed.

Further, the holder supporting member 22 is mounted on the slide base 61 in the state where respective positioning pins 126 are respectively inserted into respective positioning holes 123. After relative position with respect to this slide base 61 is adjusted, adhesive agent of a predetermined quantity is filled into gaps between the respective positioning holes 123 and the respective positioning pins 126 and solidified, whereby the holder supporting member 22 is joined (connected) to the slide base 61 in the state where it is caused to undergo positioning with high accuracy.

Further, at the slide base 61, as shown in FIG. 8, there is disposed a substantially cylindrical weight body 127 for adjusting center of gravity of the movable part serving as the entirety of slide base 61 for supporting the optical pick-up 1 in the state positioned at the outer circumferential portion of the optical system 5 of the optical pick-up 1. This weight body 127 is formed by metallic material, e.g., brass.

As shown in FIGS. 9, 11 and 12, the adjustment base 105 is formed so as take substantially rectangular plate shape, and plural positioning shafts 128 for carrying out positioning of the base chassis 57 of the base unit 51 are respectively vertically provided on the principal surface thereof. In addition, at the base chassis 57, as shown in FIG. 12, plural supports 129 which are caused to collide with the principal surface of the adjustment base 105 are respectively provided on the principal surface thereof. At these respective supports 129, there are respectively formed positioning holes 130 into which positioning shafts 128 vertically provided at the adjustment base 105 are inserted from the front end so that they are engaged.

As shown in FIGS. 9, 11 and 12, the lens holding mechanism 106 is disposed on the adjustment base 105, and includes a set of holding arms 133, 133 for holding (putting) holder supporting member 22 of the optical pick-up 1 therebetween, a supporting mechanism 134 for movably supporting these set of holding arms 133, 133 with respect to the holder supporting member 22 in directions to become close thereto and become away therefrom, and a cam mechanism 135 for driving the respective holding arms 133, 133.

At the holding arms 133, 133, as shown in FIGS. 14 and 15, there are formed, at the front end portions, engagement recessed portions 137 which are respectively engaged with engagement grooves 120 and engagement projections 121 of the holder supporting member 22 to allow the holder supporting member 22 to undergo positioning so that it is located at predetermined positions to hold it.

As shown in FIG. 15, this engagement recessed portion 137 is formed substantially V-shaped in cross section with respect to thickness direction of the holder supporting member 22. Moreover, within this engagement recessed portion 137, there is provided an engagement shaft 138 of which axial direction is caused to be in parallel to the thickness direction of the holder supporting member 22. These engagement shafts 138 are supported by elastic members 139 such as compression coil spring, etc. disposed within the holding arms 133, 133 so that they are permitted to undergo elastic displacement in the direction indicated by arrow X in FIG. 14. Accordingly, when the engagement shafts 138 are engaged with the engagement grooves 120, they are caused to undergo elastic displacement by elastic force of the elastic members 139, whereby it can be securely prevented that excessive pressing force is loaded to the holder supporting member 22 to be held.

As shown in FIG. 15, with respect to holding arms 133, 133, as the result of the fact that the engagement recessed portions 137 and the engagement shafts 138 are respectively engaged with the engagement grooves 120 and the engagement projections 121 of the holder supporting member 22, whereby it is possible to carry out positioning with high accuracy with respect to X-Y direction in parallel to the principal surface of the holder supporting member 22, and to carry out positioning with high accuracy with respect to the thickness direction of the holder supporting member 22.

As shown in FIGS. 11 and 12, the supporting mechanism 134 is provided on the adjustment base 105, and supports base end portions of the holding arms 133, 133 so that they can be moved in the direction indicated by arrow X in FIG. 11 through rotation supporting axes 141. The cam mechanism 135 includes, as shown in FIG. 11, a rotation arm 143 for carrying out movement in directions such that front end portions of the holding arms 133, 133 are caused to become close to each other and become away from each other, and a cam arm 144 for driving this rotation arm 143. The rotation arm 143 is adapted so that substantially the central portion is rotatably supported and base end portions of the holding arms 133, 133 are fixed and attached at the front end portion.

In the lens holding mechanism 106 thus constituted, when the rotation arm 143 is rotationally driven through the cam arm 144 of the cam mechanism 135, front end portions of respective holding arms 133, 133 are moved in directions to become close to the holder supporting member 22 and to become away therefrom, and are engaged with the engagement grooves 120 and the engagement projections 121 of the holder supporting member 22 to hold or put the holder supporting member 22 therebetween and to allow it to undergo positioning so that it is located at a predetermined position.

As shown in FIGS. 14 and 15, the holder supporting member 22 can be caused to undergo positioning respectively with respect to the X-direction and the Y-direction in parallel to the principal surface of the holder supporting member 22 as the result of the fact that a set of holding arms 133, 133 that the lens holding mechanism 106 has are engaged with the engagement groove 120, and can be caused to undergo positioning with respect to the thickness direction perpendicular to the principal surface of the holder supporting member 22 as the result of the fact that a set of holding arms 133, 133 are engaged with the engagement projection 121.

The holder supporting member 22 is held by the set of holding arms 133, 133 so that relative position with respect to the slide base 61 is caused to undergo positioning with high accuracy. Moreover, in the holder supporting member 22, when position in the thickness direction is caused to undergo positioning, the bottom surface of the holder supporting member 22 is slightly floated with respect to the principal surface of the slide base 61 so that a predetermined gap to permit movement adjustment with respect to the slide base 61 is ensured between the bottom surface of the holder supporting member 22 and the principal surface of the slide base 61, whereby adhesive agent is filled into this gap. Thus, the holder supporting member 22 is joined (connected) and fixed.

The lens adjustment mechanism 107 includes, as shown in FIGS. 9 and 11, an X-Y movement adjustment mechanism 146 for carrying out parallel displacement (movement) of the object lens 12 is biaxial directions of radial direction (X-direction) which is direction in parallel to the radial direction of adjustment optical disc 100 and tangential direction (Y-direction) which is direction perpendicular to the radial direction of the adjustment optical disc 100 through the holder supporting member 22 held by the lens holding mechanism 106, and a skew movement adjustment mechanism 147 for respectively carrying out inclination with respect to optical axis for the purpose of respectively adjusting radial skew to incline the object lens 12 in the radial direction with respect to the optical axis and tangential skew to incline the object lens 12 in the tangential direction with respect thereto.

The X-Y movement adjustment mechanism 146 includes, as shown in FIGS. 9 and 11, a slide table 151 for X-direction where guide rail for carrying out parallel displacement (movement) of lens holding mechanism 106 in the X-direction is formed, a slide table 152 for Y-direction where guide rail for carrying out parallel displacement (movement) of lens holding mechanism 106 in the Y-direction is formed, and drive mechanism (not shown) for respectively driving these respective slide tables.

The skew movement adjustment mechanism 147 includes, as shown in FIGS. 9 and 11, an inclination table 156 for radial direction for inclining the object lens 12 in the radial direction with respect to the steady point on the optical axis of the object lens 12, an inclination table 157 for tangential direction for inclining the object lens 12 in the tangential direction with respect to the steady point on the optical axis of the object lens 12, and drive mechanisms (not shown) for respectively driving these respective inclination tables 156, 157.

In this example, as this skew movement adjustment mechanism 147, the so-called swivel mechanism is employed, and typical swivel stage (gonio stage) which can be rotated in the radial and tangential directions of the adjustment optical disc 100 is used.

In accordance with the lens adjustment mechanism 107 thus constituted, followed by the fact that the slide table 151 for X-direction and the slide table 152 for Y-direction are respectively moved by the X-Y movement adjustment mechanism 146, the holder supporting member 22 that the lens holding mechanism 106 holds is moved. Thus, adjustment is made such that position of the optical axis of the object lens 12 with respect to the light source 11, i.e., light emitting point of the light source 11 is caused to be in correspondence with the optical axis of the object lens 12.

Moreover, in accordance with the lens adjustment mechanism 107, by respectively inclining the inclination table 156 for radial direction and the inclination table 157 for tangential direction by the skew movement adjustment mechanism 147, inclination of the optical axis of the object lens 12 is adjusted. Namely, the optical axis of the object lens 12 is adjusted so that light beams incident to the adjustment optical disc 100 through the object lens 12 is incident in a manner perpendicular to the adjustment optical disc 100. In other words, adjustment is made such that the optical axis of the object lens 12 and the surface of the adjustment optical disc 100, i.e., signal recording surface are perpendicular to each other.

The chassis holding mechanism 108 includes, as shown in FIGS. 9 and 11, a set of shaft holding arms 160, 160 disposed on the principal surface of the adjustment base 105 and adapted for holding feed shaft 62 of the base unit 51, a supporting mechanism 161 for rotatably supporting these shaft holding arms 160, 160, and a set of drive mechanisms 162, 162 including drive members 167, 167 for driving the respective shaft holding arms 160, 160.

As shown in FIGS. 11 and 12, the supporting mechanism 161 is provided on the adjustment base 105, and is adapted for rotatably supporting base end portions of the shaft holding arms 160, 160 in the direction indicated by arrow $a_1$ and in the direction indicated by arrow $a_2$ in FIG. 12 through rotation support shaft 165.

The drive mechanisms 162, 162 include, as shown in FIGS. 9 and 11, e.g., air cylinders 166 and drive members 167 driven by the air cylinders 166, respectively. The drive members 167 are adapted so that respective front end portions are fixed and attached at the base end portions of the shaft holding arms 160, 160.

In the chassis holding mechanism 108 thus constituted, air cylinders 166 of the respective drive mechanisms 162, 162 are driven so that the drive members 167 are driven. As a result, a set of shaft holding arms 160, 160 are rotated in the direction indicated by arrow $a_1$ to push the both end sides of the feed shaft 62 of the base unit 51 by the front end portions of the shaft holding arms 160, 160 to respectively hold them.

Moreover, on the adjustment base 105, at position opposite to the middle portion in the axial direction of the feed shaft 62 of the base unit 51, holding pins (not shown) caused to be in contact with the feed shaft 62 are vertically provided. Accordingly, with respect to the feed shaft 62 of the base unit 51 held by the respective holding arms 160, 160 of the chassis holding mechanism 108, the middle portion in the axial direction thereof is supported by holding pins so that feed shaft 62 of which both end portions are pressed by the shaft holding arms 160, 160 is securely fixed and held in the state where it is not bent.

As shown in FIG. 12, base holding mechanism 109 is provided on the adjustment base 105, and includes a positioning pin 172 for allowing slide base 61 of the base unit 51 to undergo positioning so that it is located at a predetermined position, a base holding arm 173 for pressing and holding the slide base 61 toward the light source 11 side in parallel to the optical axis direction, and movement mechanism (not shown) for moving this base holding arm 173 so as to become close to the slide base 61 or become away therefrom.

The positioning pin 172 is provided at position opposite to the slide base 61 as shown in FIG. 12. Moreover, at the principal surface of the slide base 61 of the base unit 51, there is provided positioning hole into which positioning pin 172 is inserted and engaged although not shown.

As shown in FIG. 12, the base holding arm 173 is adapted so that a holding portion 176 engaged with the outer circumferential portion of the slide base 61 is formed at the front end portion, and the base end portion is supported by movement mechanism (not shown). The base holding arm 173 is adapted it becomes close to the outer circumferential portion of the slide base 61 or becomes away therefrom by the movement mechanism, and the holding portion 176 is engaged with the outer circumferential portion to hold the slide base 61.

In accordance with the base holding mechanism 109 thus constituted, as shown in FIG. 12, positioning pin 172 is inserted into positioning hole of the slide base 61 so that it is engaged therewith. Thus, the slide base 61 is caused to undergo positioning with high accuracy so that it is located at a predetermined position in a direction in parallel to the axial direction of the feed shaft 62. Further, in this base holding mechanism 109, as the result of the fact that the slide base 61 is pressed and biased toward the light source 11 side in parallel to the optical axis of the object lens 12 by the base holding arm 173, force applied to the slide base 61 acts as reaction of biasing force biased toward the object lens 12 side in parallel to the optical axis direction of the object lens 12 when the light source 11 of the optical system 5 attached at the slide base 61 is caused to undergo positioning so that it is located at the light source holding arm 180 of light source movement adjustment mechanism 111 which will be described later. Namely, in the base holding arm 173, by biasing force of light source holding arm 180 of light source movement adjustment mechanism 111, it is securely prevented that the slide base 61 floats toward the object lens 12 side to fix the slide base 61.

Figure 13:
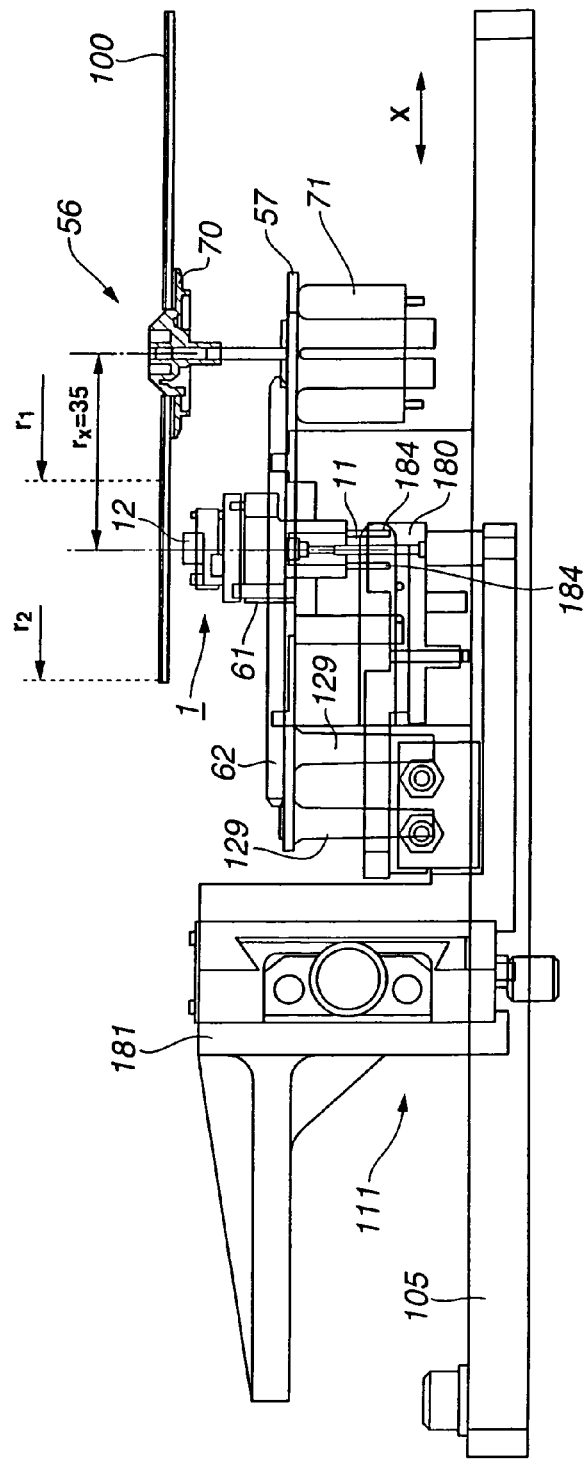
FIG. 13 is a side view showing light source adjustment mechanism that the adjustment apparatus for optical pick-up has.

The light source movement adjustment mechanism 111 includes, as shown in FIGS. 12 and 13, the light source holding arm 180 for holding the light source 11 of the optical pick-up 1, and a movement mechanism 181 for moving the light source holding arm 180 so that it becomes close to the light source 11 and it becomes away therefrom and for moving position of the light source 11 held by the light source holding arm 180. At the light source holding arm 180, as shown in FIGS. 12 and 13, four engagement pins 184 engaged with the outer circumferential portion of the light source 11 are respectively provided at the front end portion thereof, and the base end portion is supported by the movement mechanism 181. Moreover, at the outer circumferential portion of the light source 11, plural engagement grooves (not shown) are respectively provided. The light source holding arm 180 is caused to become close to the outer circumferential portion of the light source 11 and become away therefrom by the movement mechanism 181 so that the engagement pins 184 are engaged with engagement grooves to hold the light source 11.

The movement mechanism 181 carries out parallel displacement (movement) of the light source holding arm 180 in the direction indicated by arrow X and in the direction indicated by arrow Y in FIGS. 12 and 13 to thereby carry out movement adjustment so that center of the light source 11 is caused to be in correspondence with the steady point on the optical axis of the object lens 12. Moreover, the movement mechanism 181 can rotate the light source 11 with the light emitting point of the light source 11 being as center, and inclines the light source 11 to adjust the light source 11 so that it is located at a predetermined position.

Further, in accordance with this light source movement adjustment mechanism 111, it is possible to carry out movement adjustment of light emitting point of the light source 11 so that it is positioned on line in the radial direction of the adjustment optical disc 100 in parallel to the axial direction of the feed shaft 62 of the base unit 51.

The output control circuit section 119 adjusts output of the light source 11 in accordance with detection value detected by the signal detecting section 115.

The detection mechanism 113 includes, as shown in FIG. 9, a CCD (Charge-Coupled Devices) camera 190 for detecting laser beams emitted from the object lens 12, a movement mechanism 191 for moving this CCD camera 190 in the X-direction and in the Y-direction, and control section (not shown) for controlling the CCD camera 190. In this detection mechanism 113, position of center of the CCD camera 190 is caused to undergo positioning in advance with high accuracy by master disc (not shown).

A method of adjusting relative position between the object lens 12 and the light source 11 of the optical pick-up 1 and position and inclination with respect to the optical axis of the object lens 12 by using the optical pick-up adjustment unit 101 and the adjustment optical disc 100 which have been constituted as described above will be described.

In the optical pick-up adjustment unit 101, as shown in FIG. 12, as the result of the fact that when the base unit 51 is mounted on the adjustment base 105, positioning shaft 128 is inserted into positioning hole 130 of support 129 of the base chassis 57 of the base unit 51, the base unit 51 is caused to undergo positioning so that it is located at a predetermined position on the adjustment base 105 and is held thereat.

Further, in the optical pick-up adjustment unit 101, positioning pin 172 of base holding mechanism 109 is engaged with the positioning hole of the slide base 61, whereby the slide base 61 is caused to undergo positioning so that it is located at a predetermined position and is held thereat.

The optical pick-up adjustment unit 101 holds feed shaft 62 of base unit 51 mounted on the adjustment base 105 by shaft holding arms 160, 160 of the chassis holding mechanism 108, whereby the base unit 51 is caused to three-dimensionally undergo positioning with respect to the position on the adjustment base 105 and is held thereat.

Further, at the optical pick-up adjustment unit 101, the optical pick-up 1 is mounted on the slide base 61 where it is movably assembled through feed shaft 62 on the base chassis 57 of the base unit 51 and is combined therewith. The optical pick-up 1 is combined or assembled so that it is located at a predetermined position with respect to the base unit 51 as the result of the fact that positioning pin 126 of the slide base 61 is inserted through positioning hole 123 of the holder supporting member 22.

The optical pick-up adjustment unit 101 holds the holder supporting member 22 of the optical pick-up 1 mounted on the slide base 61 by the holding arms 133, 133 of the lens holding mechanism 106 so that position of the holder supporting member 22 with respect to the slide base 61 is caused to undergo positioning. Thus, position of the object lens 12 is caused to three-dimensionally undergo positioning. In addition, in the optical pick-up adjustment unit 101, the light source 11 is held by light source holding arm 180 of the light source movement adjustment mechanism 111.

Figure 16:
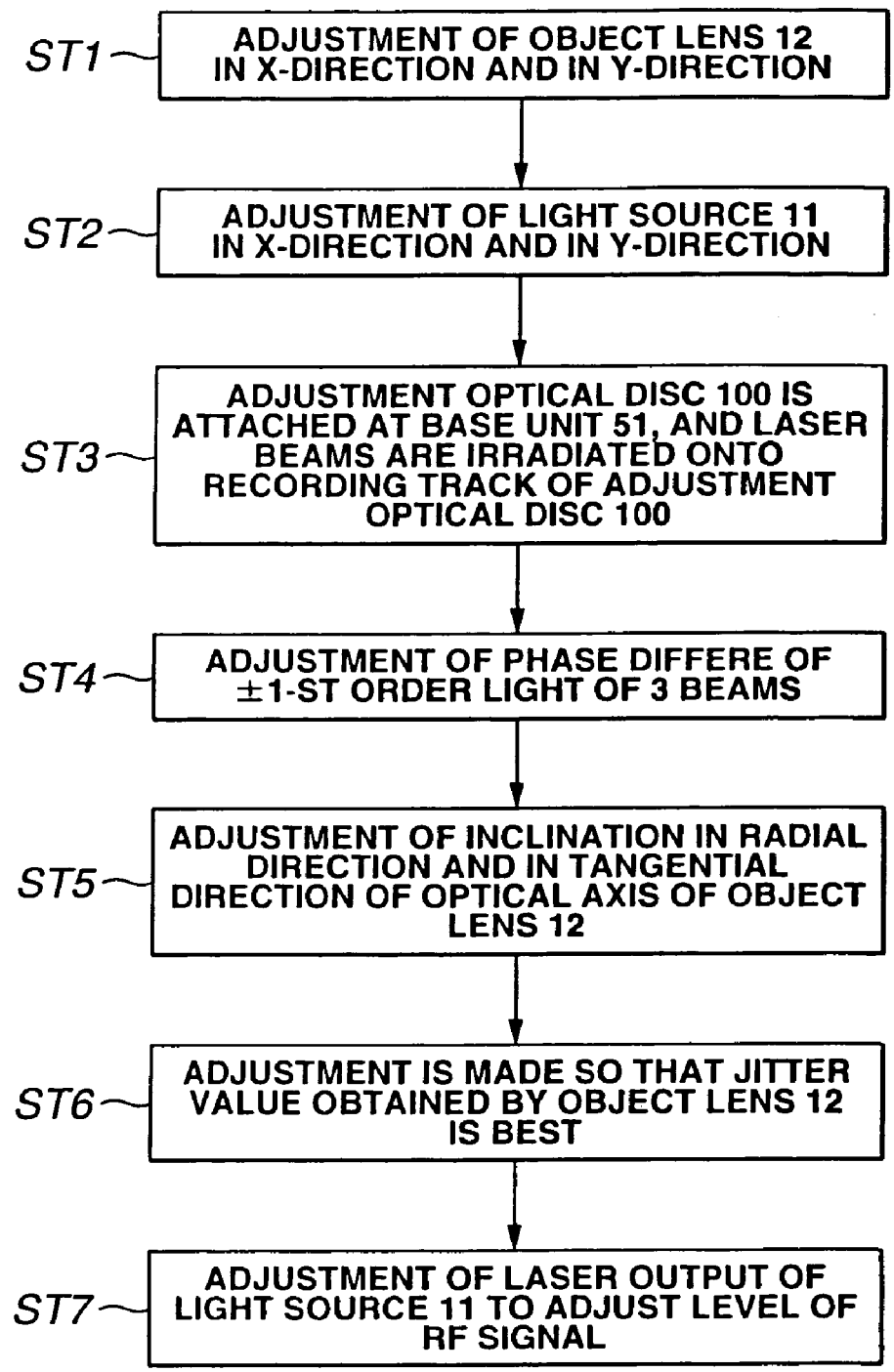
FIG. 16 is a flowchart showing adjustment operation by the adjustment apparatus for optical pick-up.

Initially, the optical pick-up adjustment unit 101 moves the holder supporting member 22 held by the holding arms 133, 133 of the lens holding mechanism 106, as indicated by step ST1 in FIG. 16, in the X-direction and in the Y-direction by the X-Y movement adjustment mechanism 146 of the lens adjustment mechanism 107 to thereby adjust the object lens 12 with respect to the light source 11.

Subsequently, the optical pick-up adjustment unit 101 carries out movement adjustment of the light source 11 held by the light source holding arm 180 of the light source movement adjustment mechanism 111 in the X-direction and in the Y-direction, as indicated by step ST2 in FIG. 16, to thereby carry out adjustment so that center of hologram element of the light source 11 of the optical pick-up 1 is caused to be in correspondence with the center of CCD camera 190 of the detection mechanism 113 or light emitting point of the light source 11 is caused to be in correspondence with the center of CCD camera 190.

As indicated by step ST3 in FIG. 16, at the base unit 51, adjustment optical disc 100 is attached on the disc table 70 of the disc rotation drive mechanism 56. Further, in the optical pick-up 1, laser beams emitted from the light source 11 are irradiated onto recording tracks of the adjustment optical disc 100. In this state, in the optical pick-up 1, the light receiving portion 13 for receiving return light from the adjustment optical disc 100 and electromagnetic drive portion 25 become operative. Thus, focusing servo of the object lens 12 is applied.

As indicated by step ST4 in FIG. 16, the optical pick-up adjustment unit 101 drives the disc rotation drive mechanism 56 of the base unit 51, whereby position of the light source 11 held by the light source holding arm 180 of the light source movement adjustment mechanism 111 is caused to undergo movement adjustment in the state where the adjustment optical disc 100 is rotationally driven to rotate the ±1-st order light with the 0-th order light constituting three beams being as center to carry out adjustment thereof. Thus, adjustment is made such that phase difference between ±1-st order light becomes equal to 180°. On the basis of output from the light receiving portion 13 of the ±1-st order light of three beams by the signal detecting section 115, tracking servo can be applied to the optical pick-up 1. Namely, on the basis of output signal from the light receiving portion 13 which has received ±1-st order light so that 0-th order light of laser beams emitted from the optical pick-up1 scans concentric recording tracks of the adjustment optical disc 100, tracking servo is carried out.

As indicated by step ST5 in FIG. 16, the optical pick-up adjustment unit 101 respectively adjusts inclinations in the radial direction and in the tangential direction with respect to the optical axis of the objet lens 12 held by the lens holding mechanism 106 by skew movement adjustment mechanism 147 of the lens adjustment mechanism 107. Thus, skew with respect to the recording surface of the adjustment optical disc 100 is adjusted. In the optical pick-up 1, inclinations of respective directions of the optical axis of the above-described object lens 12 are adjusted in the state where tracking servo is applied. Thus, adjustment is made such that jitter value of reproduction signal becomes most satisfactory or best.

As indicated by step ST7 in FIG. 16, the optical pick-up adjustment unit 101 adjusts output of laser beams emitted from the light source 11 by output control circuit section 188 of light source control section 112 of the light source movement adjustment mechanism 111 to adjust level of RF signal obtained from the adjustment optical disc 100.

As described above, at the time of adjustment, adjustment optical disc 100 having concentric recording tracks is used, whereby there is no possibility that the optical axis of the object lens 12 moves from the inner circumferential side to the outer circumferential side of the adjustment optical disc 100 with passage of time. Accordingly, adjustment can be made in the state where the optical axis of the object lens 12 is caused to be in correspondence with the center of laser beams. It is to be noted that when rigorously viewed, shift (deviation) takes place between the optical axis of the object lens 12 and the adjustment optical disc 100 by dynamic displacement quantity of quantity of eccentricity of the adjustment optical disc 100 and d.c. component of tracking error signal.

Subsequently, in the state where adjustment of the object lens 12 is completed, in the optical pick-up 1, the object lens 12 is caused to undergo track jump toward the inner circumferential side or the outer circumferential side of the adjustment optical disc 100, it is possible to measure the so-called visual field characteristic which is the optical characteristic at position by n tracks ×1.6 µm. In this case, n is arbitrary integer.

At this time, in the optical pick-up 1, in the case where there is used typical optical disc in which recording tracks are formed to be spiral, since position of the optical axis of the object lens 12 changes at all times, it is impossible to measure precise value. However, by using adjustment optical disc 100 having concentric recording tracks as described above, adjustment can be made.

Figure 17:
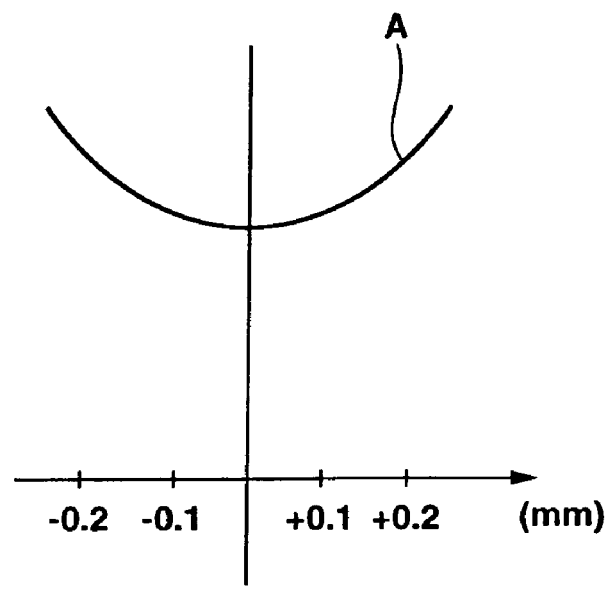
FIG. 17 is a view showing the relationship between displacement quantity of visual field of object lens and jitter value.

In addition, by using adjustment optical disc 100, it is possible to measure visual field characteristic which is optical characteristic at position caused to undergo displacement by arbitrary recording tracks. The relationship between displacement quantity of visual field of the object lens 12 and jitter value is shown in FIG. 17. In FIG. 17, the abscissa indicates displacement quantity (mm) of the optical axis of the object lens 12, and the curve A indicates actually measured value of jitter value.

When measurement value of the visual field characteristic is indicated as shown in FIG. 17, in the case where measurement of position where the object lens 12 is caused to undergo displacement by arbitrary offset quantity, e.g., 1 mm from the optical center, measurement is carried out at the position caused to undergo track jump by 1000 µm/1.6 µm=625 tracks. Displacement quantity of the object lens 12 may be determined by calculation if lower frequency band sensitivity of tracking servo by the electromagnetic drive portion 25 and drive voltage of tracking servo are determined.

In the optical pick-up including object lens 12 thus adjusted, e.g., ultraviolet hardening type adhesive agent, etc. is filled at the engagement portion between the positioning hole 123 of the holder supporting member 22 and positioning pin 126 of the slide base 61 of the base unit 51, whereby the holder supporting member 22 is joined (connected) onto the slide base 61 and is fixed thereat.

Figure 18:
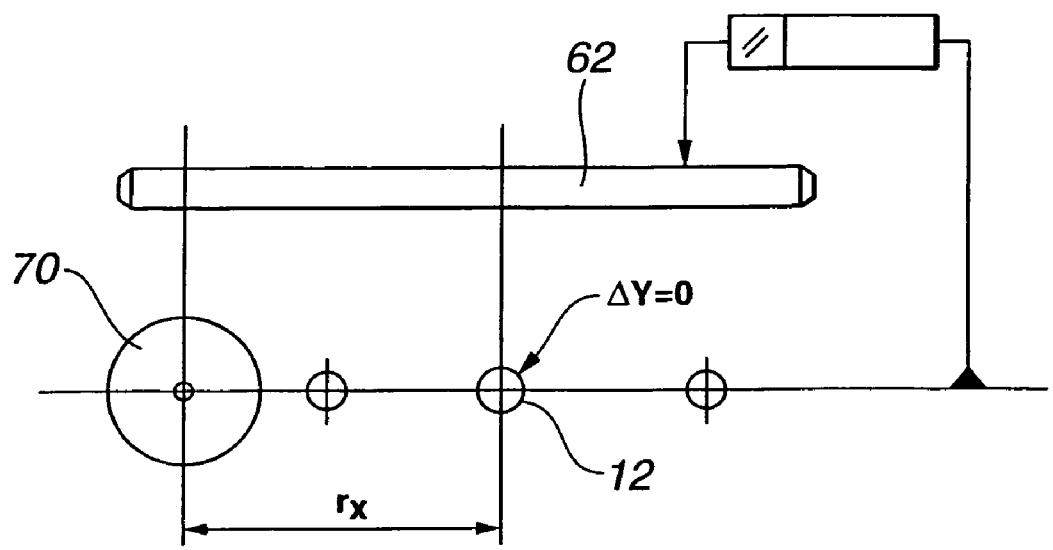
FIG. 18 is a view showing ideal position of object lens and ±1-st order light.

In the case where the object lens 12 is caused to be in parallel to the axial direction of the feed shaft 62 so that the optical axis of the object lens 12 is positioned on line in the radial direction passing through center of rotation of the adjustment optical disc 100, change of phase difference of the ±1-st order light between the innermost circumferential side and outermost circumferential side of adjustment optical disc 100 is caused to be "0" as shown in FIG. 18.

Figure 19:
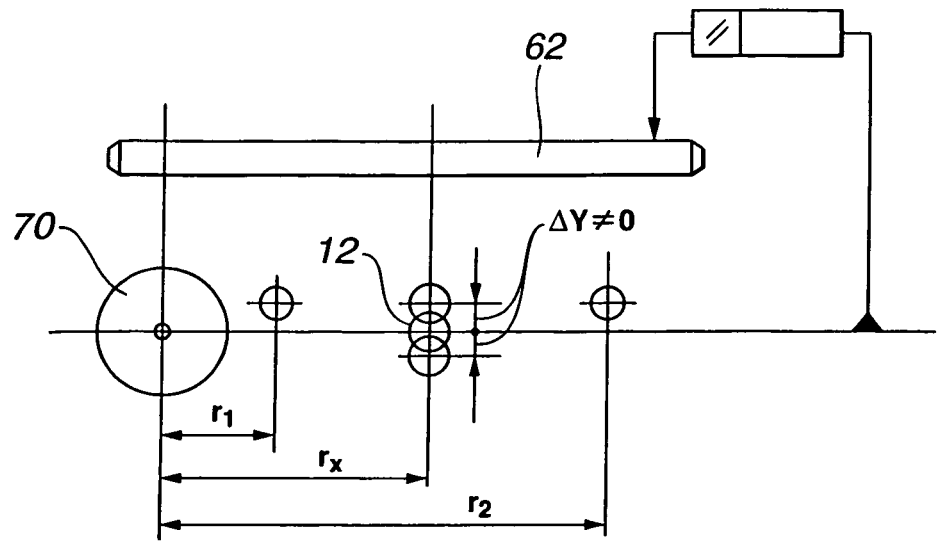
FIG. 19 is a view showing actual position of object lens and ±1-st order light.

However, in actual adjustment, it is difficult to allow the object lens 12 to be in parallel to the axial direction of the feed shaft 62 to position the optical axis of the lens 12 on line in radial direction passing through center of rotation of the adjustment optical disc 100. As shown in FIG. 19, the optical axis of the object lens 12 is caused to undergo displacement by very small displacement quantity $\Delta Y$ in the direction perpendicular to the axial direction of the feed shaft 62 with respect to center of rotation of spindle motor 71 of the disc rotation drive mechanism 56 which is center of rotation of the adjustment optical disc 100. Since rays of ±1-st order light rotate with the 0-th order light of three beams being as center relatively with respect to recording tracks followed by movement from the innermost circumference to the outermost circumference of the adjustment optical disc 100 by this displacement quantity $\Delta Y$, there takes place the so-called R dependence which is change of phase difference in the ±1-st order light of three beams at the innermost circumference and the outermost circumference of the adjustment optical disc 100.

Figure 20:
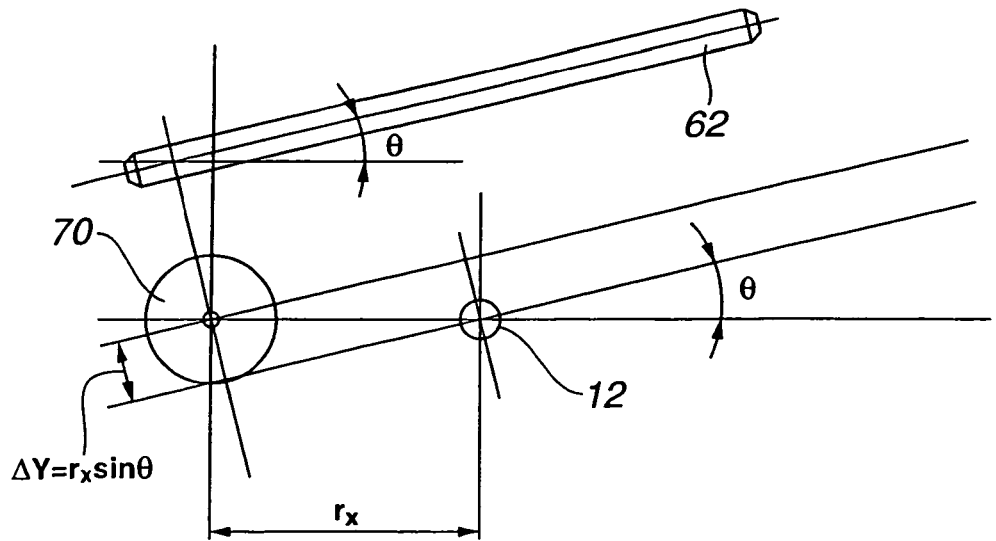
FIG. 20 is a view showing the state where the axial direction of feed shaft is inclined.

Further, in the case where the feed shaft 62 of the base chassis 57 is inclined by $\theta$ degrees with respect to reference, there is provided shift (deviation) equivalent to $\Delta Y = r_x \cdot \sin \theta$ as shown in FIG. 20.

In view of the above, explanation will be given below in connection with a method of carrying out adjustment so that R dependence which is change of phase difference of ±1-st order light at the inner circumference and the outer circumference of the adjustment optical disc 100 on the assumption that displacement quantity $\Delta Y$ takes a certain value with respect to the position of optical axis of object lens 12 to be adjusted.

At compact disc as typical optical disc, there are provided lead-in area having TOC (Table Of Contents) at the inner circumferential side where information are recorded and lead-out area at the outer circumferential side of the recording area.

In such a compact disc, if lead-in area is at the position in the radial direction from the center of the disc (hereinafter simply referred to as position in the radial direction) $r_1$ and lead-out area is at the position $r_2$ in the radial direction, in the case where the innermost circumference is caused to be the inner circumferential side of the lead-in area, the position $r_1$ in the radial direction becomes equal to 23 (mm), and in the case where the innermost circumference is caused to be the inner circumferential side of the recording area, the position $r_1$ in the radial direction becomes equal to 25 (mm). Moreover, in the compact disc, in the case where the innermost circumference is caused to be outer circumferential side of lead-out area, the position $r_2$ in the radial direction becomes equal to 58.5 (mm), and in the case where the outermost circumference is caused to be outer circumferential side of the recording area, the position $r_2$ in the radial direction becomes equal to 58 (mm). Further, the lead-in area, the recording area and the lead-out area of the adjustment optical disc 100 are caused to be those of the compact disc.

Figure 21:
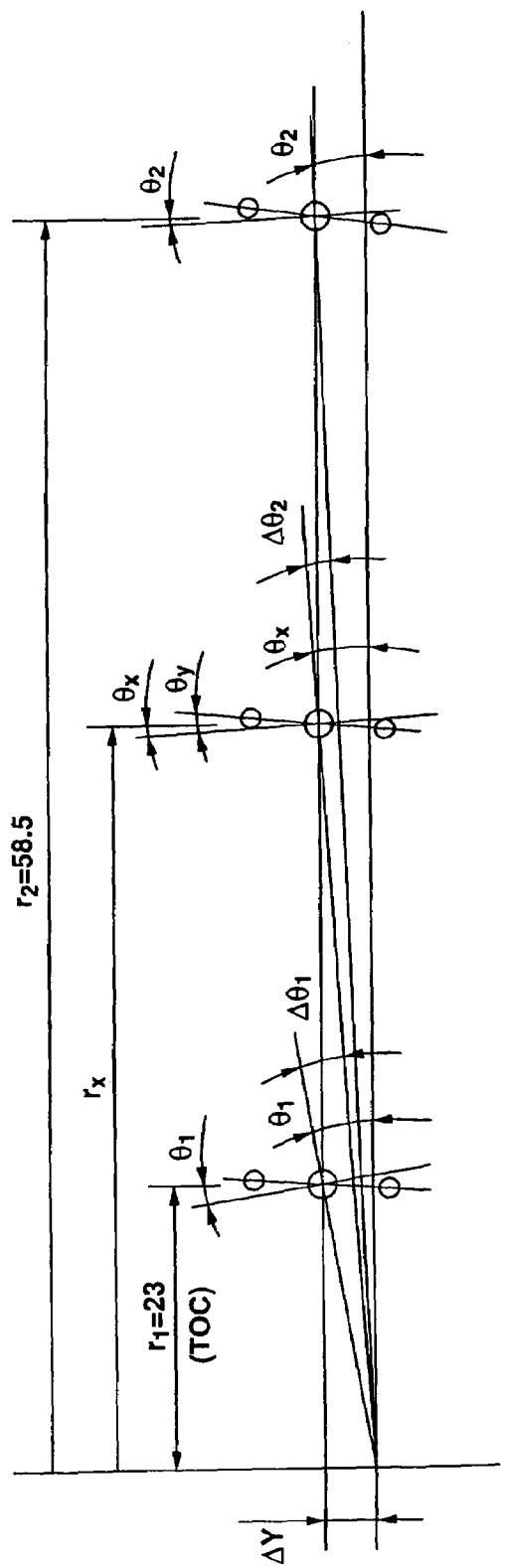
FIG. 21 is a view showing a method of carrying out adjustment so that R dependence is minimum.

As a method of minimizing R dependence, as shown in FIG. 21, there is a method of adjusting optical axis of the object lens 12 with the position $r_x$ in the radial direction being as reference so that change of phase of the ±1-st order light when the 0-th order light is moved from the position $r_x$ in the radial direction to the position $r_1$ in the radial direction of the inner circumferential side and change of phase of the ±1-st order light when the 0-th order light is moved from the position $r_x$ in the radial direction to the position $r_2$ in the radial direction of the outer circumferential side are substantially equal to each other.

The above-described optical pick-up adjustment unit 101 is used to calculate position $r_x$ in the radial direction serving as reference for adjusting the optical axis of the object lens 12.

Figure 22:
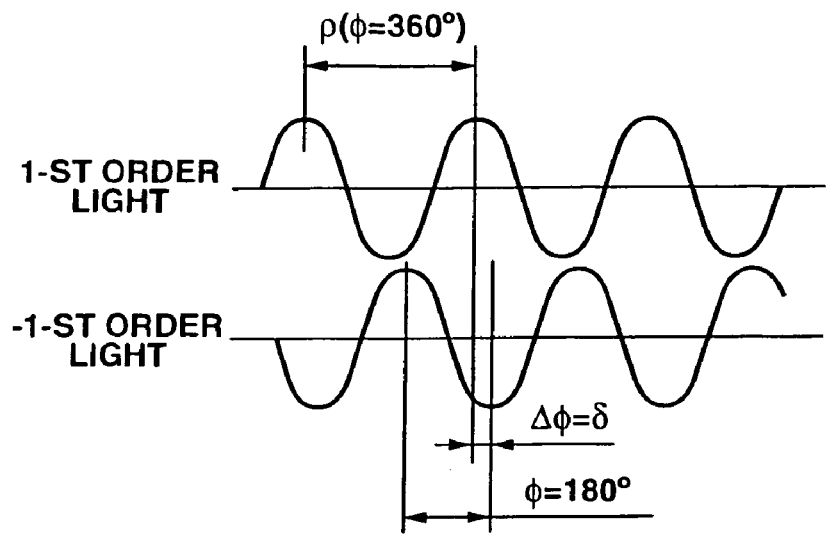
FIG. 22 is a view showing phase difference of ±1-st order light.

As shown in FIGS. 21 and 22, at $r_x$ which is the middle position in the radial direction of adjustment optical disc 100, rays of ±1-st order light are rotated around the optical axis of the 0-the order light of three beams to carry out position adjustment, whereby phase difference between respective rays of the ±1-st order light is 180°, if positional shift between axis of the feed shaft 62 and center of rotation of the adjustment optical disc 100 is displacement quantity $\Delta Y$, there is calculated position $r_x$ in the radial direction such that deviations® dependences) $\delta_1$, $\delta_2$ from 180° of phase difference of the ±1-st order light at the position $r_1$=23 (mm) in the radial direction of the inner circumferential side and the position $r_2$=58.5 (mm) in the radial direction of the outer circumferential side are equal to each other.

$$\Delta\theta_1 = \Delta Y\{(1/r_1) - (1/r_x)\}$$

$$\Delta\theta_2 = \Delta Y\{(1/r_x) - (1/r_2)\}$$

if $\Delta\theta_1 = \Delta\theta_2$, $$\{(1/r_1) - (1/r_x)\} = \{(1/r_x) - (1/r_2)\}$$

$$(1/r_1) + (1/r_2) = 2/r_x$$

Accordingly, $r_x$ is given as $$r_x = 2/\{(1/r_1) + (1/r_2)\}$$

In this case, when $r_1$ is equal to 23 (mm) and $r_2$ is equal to 58.5 mm, $r_x$=33.0 (mm) is provided.

Alternatively, when consideration is made in connection with the case where innermost circumference of the adjustment optical disc 100 is the position $r_i$=25 (mm) in the radial direction of the inner circumferential side of the recording area and outermost circumference is the position $r_2$=58 (mm) in the radial direction of the outer circumferential side of the recording area, $r_x$=34.9≈35 (mm).

Figure 23:
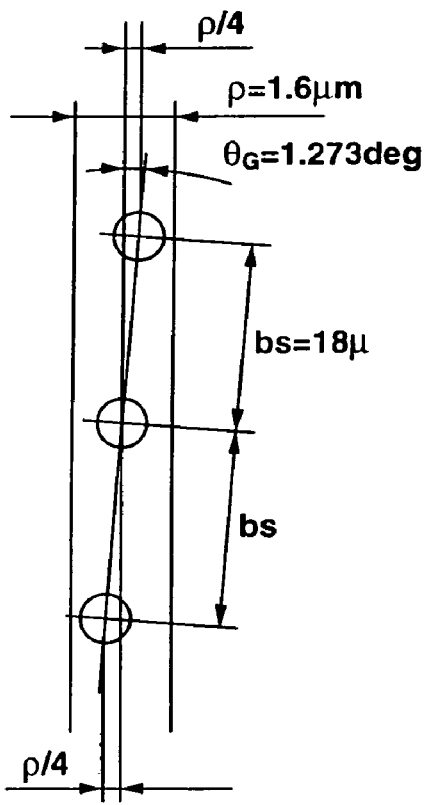
FIG. 23 is a view showing relative position between the 0-th order light and the ±1-st order light.

At this time, as shown in FIG. 23, if $\Delta\theta_1 = 0.01318 \times \Delta Y$, $\Delta\theta_2 = 0.01321 \times \Delta Y$, distance between center of respective rays of ±1-st order light and center of the 0-th order light is beam spacing bs, and track pitch of recording tracks of the adjustment optical disc 100 is P, in the case where bs=18 (μm) and P=1.6 (μm), $\theta_G = (P/4)/bs = 0.0222$ (rad)=1.273 (deg).

Change of phase when moved from position $r_x$ in the radial direction serving as reference toward position $r_2$ in the radial direction of the outer circumferential side is expressed as $\Delta\phi_1=\delta_1$, deviation $\delta_2$ is expressed as follows.

$$\delta_2=\Delta\theta_2/\theta_G\times180=106.99\times\Delta Y$$

At the time of adjustment, when adjustment is made such that the optical axis of the object lens 12 is position r=33 (mm) in the radial direction, and $\Delta Y$ is caused to fall within 0.05 (mm), R dependence is expressed as $\delta_1=\delta_2=5.3$ (deg) and there results R dependence of $\pm5°$ at inner and outer circumferences of the adjustment optical disc 100. Moreover, at the time of adjustment, if phase difference of $\pm1$-st order light is adjusted so that it falls within the range of $\pm5$ (deg), it is possible to suppress phase difference of $\pm1$-st order light at inner and outer circumferences of the adjustment optical disc 100 so that it falls within the range of $\pm10°$ as a whole.

For this reason, at base holding mechanism 109 that the above-described optical pick-up adjustment unit 101 has, there is provided positioning pin 172 for carrying out positioning of slide base 61 so that optical axis center of the object lens 12 is located at position r=35 (mm) in the radial direction serving as reference for adjustment. Accordingly, in the base holding mechanism 109, positioning pin 172 is inserted into positioning hole of the slide base 61 to thereby allow the optical axis of the object lens 12 to undergo positioning so that it is located at position r=35 (mm) in the radial direction.

In the above-described optical pick-up adjustment unit 101, when the optical axis of the object lens 12 of the optical pick-up 1 is adjusted by adjustment optical disc 100 having concentric recording tracks, the optical axis of the object lens 12 is adjusted and is caused to undergo positioning with recording track at a predetermined middle position in the radial direction such that phase difference of the $\pm1$-st order light at innermost circumference of the adjustment optical disc 100 and phase difference of the $\pm1$-st order light at the outermost circumference are substantially equal to each other being as reference. Thus, R dependence which takes place can be minimized.

As described above, in the optical pick-up adjustment unit 101, adjustment of the optical pick-up 1 is carried out by using adjustment optical disc 100 where recording tracks are concentrically provided, whereby laser beams caused to be in correspondence with recording tracks of the adjustment optical disc 100 are prevented from deviating from recording tracks. For this reason, there does not take place the so-called visual field shift (deviation) that object lens 12 deviates from the optical center with passage of time. Therefore, degradation, etc. of reproduction signal followed by degradation of optical characteristic by visual field shift (deviation) of the object lens 12 is prevented. Thus, it is possible to carry out position adjustment of the optical system 5 such as object lens 12, etc. with high accuracy and easily in the state where the optical axis of the object lens 12 and the optical center are caused to be in correspondence with each other at all times.

Further, in accordance with the optical pick-up adjustment unit 101, since the so-called feed operation to relatively move the optical pick-up 1 in the radial direction with respect to the adjustment optical disc 100 becomes unnecessary, adjustment can be made in the state combined with the base unit 51. For this reason, in accordance with this optical pick-up adjustment unit 101, as compared to the case where adjustment is made by single body of the optical pick-up 1, unevenness by adjustment can be reduced.

Further, the optical pick-up adjustment unit 101 uses adjustment optical disc 100 having concentric recording tracks to thereby allow the optical pick-up 1 to undergo track jump to obtain reproduction signal in the state where the optical axis of the object lens 12 is positionally shifted with respect to the optical center intentionally by arbitrary shift quantity to thereby measure visual field characteristic of the optical pick-up 1, thus making it possible to adjust the visual field characteristic.

Further, in accordance with the optical pick-up adjustment unit 101, in the case where the so-called three beam method is used as a detection method for tracking error of the optical system 5 when position of the optical axis of the object lens 12 is adjusted while reproducing recording tracks of the adjustment optical disc 100, the optical characteristic of the object lens 12 is adjusted with recording track of a predetermined middle position in the radial direction of adjustment optical disc 100 such that change quantities of respective phase differences of the $\pm1$-st order light at the innermost circumference and the outermost circumference of the adjustment optical disc 100 are substantially equal to each other being as reference, thereby making it possible to minimize change quantity of phase difference of the $\pm1$-st order light at the time of reproduction.

Further, in accordance with the optical pick-up adjustment unit 101, since the configuration can become relatively simple, it can be manufactured at lower cost as compared to the conventional optical pick-up adjustment unit.

Further, the optical axis of the object lens 12 is adjusted and is caused to undergo positioning with recording track at a predetermined middle position in the radial direction such that phase difference of the $\pm1$-st order light at the innermost circumference of adjustment optical disc 100 and phase difference of the $\pm1$-st order light at the outermost circumference become substantially equal to each other being as reference when the optical axis of the object lens 12 of the optical pick-up 1 is adjusted by adjustment optical disc 100 having concentric recording tracks. Thus, R dependence which takes place can be minimized.

In addition, in accordance with the optical pick-up adjustment method according to this invention, adjustment optical disc 100 having concentric recording tracks is used to adjust relative position of the object lens 12 with respect to the light source 11 and inclination of the optical axis of the object lens 12, thereby making it possible to reduce unevenness by adjustment and to carry out adjustment with high accuracy as the reproduction system as compared to the case where adjustment is carried out by single body of the optical pick-up 1.

INDUSTRIAL APPLICABILITY

As described above, in accordance with the adjustment optical disc for optical pick-up according to this invention, adjustment can be made with high accuracy in the state where the optical axis of the object lens and the optical design center are caused to be in correspondence with each other at all times.

Further, in accordance with the adjustment method for optical pick-up according to this invention, adjustment can be made with high accuracy in the state where the optical axis of the object lens and the optical design center are caused to be in correspondence with each other at all times.

In addition, in accordance with the adjustment apparatus for optical pick-up according to this invention, adjustment can be made with high accuracy in the state where the optical axis of the object lens and the optical design center are caused to be in correspondence with each other at all times.

The invention claimed is:

1. An adjustment method for an optical pick-up with a device including an optical pick-up having a light source for emitting light beams and an object lens for irradiating light beams onto an adjustment optical disc assembled on a base unit including a slide base for supporting the optical pick-up, a guide shaft for movably supporting the slide base, a movement mechanism for moving the slide base in a radial direction of the adjustment optical disc and a disc rotation drive mechanism for rotationally driving the adjustment optical disc, said method comprising irradiating light beams from the optical pick-up onto the adjustment optical disc, the adjustment optical disk having concentric recording tracks, to adjust a relative position of the object lens with respect to the light source and an inclination of the optical axis of the object lens; and setting a relative position of the object lens with respect to the light source, and setting an inclination of the optical axis of the object lens with a recording track at a middle position in the radial direction of the adjustment optical disc, such that phase differences of the ±1-st order light at the innermost circumferential side and the outermost circumferential side of the adjustment optical disc become substantially equal to each other being as reference.

2. The adjustment method for optical pick-up as set forth in claim 1, further comprising:

holding the base unit and holding the optical pick-up, with the guide shaft being a reference, when light beams emitted from the light source follow and scan recording tracks of the adjustment optical disc on the basis of a detection result of ±1-st order light of the 0-th order light and the ±1-st order light generated on the basis of light beams emitted from the light source of the optical pick-up, thus to carry out an adjustment so that the optical axis of the object lens and a light emitting point of the light source are in correspondence with each other;

adjusting a position of the optical axis of the object lens with a parallel displacement mechanism, said adjusting made in a direction in parallel to a radial direction of the adjustment optical disc and in a direction perpendicular to the radial direction;

adjusting a phase difference of the ±1-st order light emitted from the optical pick-up;

adjusting the optical axis of the object lens with a swivel mechanism configured to adjust inclinations of the optical axis of the object lens in the radial direction of the adjustment optical disc and in the direction perpendicular to the radial direction; and fixing the optical pick-up with respect to the base unit to thereby allow the optical pick-up to undergo positioning so that it is located on the base unit.

* * * * *

UNITED STATES PATENT AND TRADEMARK OFFICE
CERTIFICATE OF CORRECTION

| | |
|---|---|
| PATENT NO. | : 7,020,059 B2 |
| APPLICATION NO. | : 11/109672 |
| DATED | : March 28, 2006 |
| INVENTOR(S) | : Yasuo Osada et al. |

Page 1 of 1

It is certified that error appears in the above-identified patent and that said Letters Patent is hereby corrected as shown below:

Column 6, Line 49, Change "µper" to --µm per--.

Signed and Sealed this

Twenty-fourth Day of October, 2006

JON W. DUDAS
*Director of the United States Patent and Trademark Office*